United States Patent
Ilami et al.

(10) Patent No.: US 10,405,165 B2
(45) Date of Patent: Sep. 3, 2019

(54) QUICK PAIR

(71) Applicant: Microsoft Technology Licensing, LLC, Redmond, WA (US)

(72) Inventors: Steven Mathew Ilami, Seattle, WA (US); Heming Wen, Bellevue, WA (US); Artur Moura Aguiar, Redmond, WA (US); Maxim Kudryavtsev, Seattle, WA (US); Steffen Froehlich, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/858,908

(22) Filed: Dec. 29, 2017

(65) Prior Publication Data

US 2019/0158999 A1    May 23, 2019

Related U.S. Application Data

(60) Provisional application No. 62/590,164, filed on Nov. 22, 2017, provisional application No. 62/590,022, filed on Nov. 22, 2017.

(51) Int. Cl.
*H04B 7/00* (2006.01)
*H04W 4/80* (2018.01)
(Continued)

(52) U.S. Cl.
CPC .......... *H04W 4/80* (2018.02); *G06Q 30/0251* (2013.01); *H04B 1/3827* (2013.01); *H04W 8/005* (2013.01)

(58) Field of Classification Search
CPC ..... H04W 4/008; H04W 8/005; H04J 3/1605; H04J 3/242
See application file for complete search history.

(56) References Cited

U.S. PATENT DOCUMENTS

2007/0124459 A1   5/2007   Kasama
2014/0355517 A1*   12/2014   Reunamaki ........... H04W 8/005
                                                    370/328

(Continued)

FOREIGN PATENT DOCUMENTS

EP       2922261 A1    9/2015
EP       2956794 A1    12/2015

OTHER PUBLICATIONS

"International Search Report and Written Opinion Issued in PCT Application No. PCT/US18/060207", dated Feb. 14, 2019, 12 Pages.

(Continued)

*Primary Examiner* — Tuan Pham
(74) *Attorney, Agent, or Firm* — Mark K. Young; Mayer & Williams PC

(57) ABSTRACT

A host device, such as a laptop or desktop computer, that supports wireless point-to-point connections with peripheral devices, such as a pair of headphones, mouse, etc., is configured with quick pair with which the host device can automatically surface a toast on the UI for the user to pair the host and peripheral devices when the peripheral device is within range. For example, a pattern within an advertisement payload can be transmitted, or beaconed, by the peripheral device to the host device, where the host device then identifies, based on the pattern, that the peripheral device is quick pair enabled. When the peripheral device is within range, the host device then automatically surfaces a toast for the user to pair the two devices, and moves the toast to a notification center in case the user wishes to pair the device at a later time.

4 Claims, 30 Drawing Sheets

(51) Int. Cl.
*G06Q 30/02* (2012.01)
*H04W 8/00* (2009.01)
*H04B 1/3827* (2015.01)

(56) References Cited

U.S. PATENT DOCUMENTS

| | | |
|---|---|---|
| 2016/0277875 A1* | 9/2016 | Ivanova ............... H04W 76/14 |
| 2016/0380778 A1 | 12/2016 | Shen et al. |
| 2017/0075405 A1 | 3/2017 | Jensen et al. |
| 2017/0105096 A1 | 4/2017 | Olson |
| 2017/0281060 A1 | 10/2017 | Wedekind et al. |
| 2018/0115540 A1 | 4/2018 | Moiyallah et al. |
| 2018/0132287 A1* | 5/2018 | Cheng .................. H04W 12/04 |
| 2019/0159000 A1 | 5/2019 | Ilami et al. |

OTHER PUBLICATIONS

"Non Final Office Action Issued in U.S. Appl. No. 15/859,099", dated Apr. 10, 2019, 10 Pages.

"International Search Report and Written Opinion Issued in PCT Application No. PCT/US2018/060208", dated May 9, 2019, 20 Pages.

* cited by examiner

350

300

800

1200

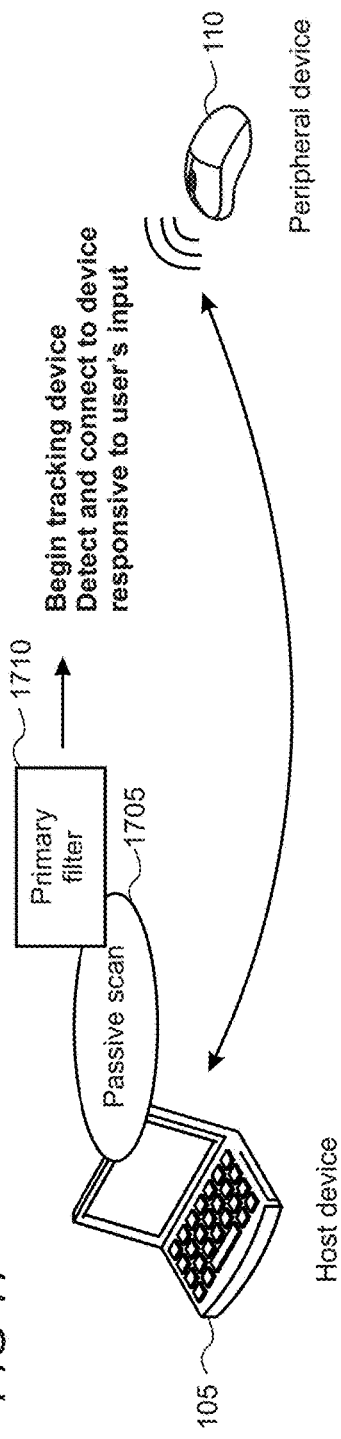
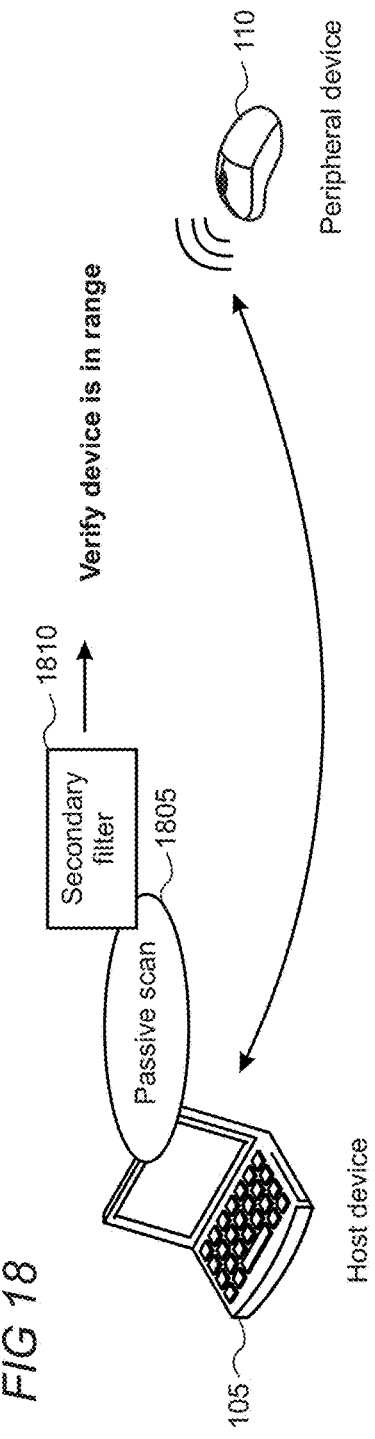

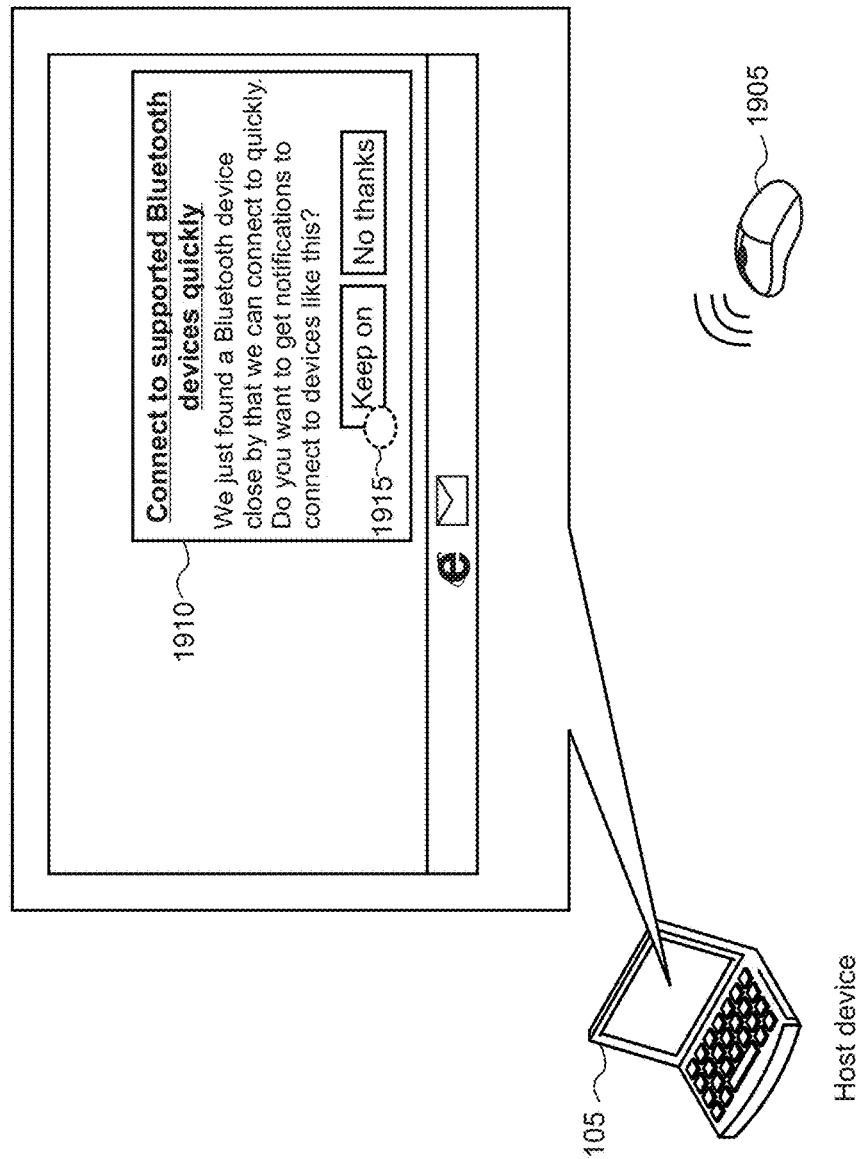

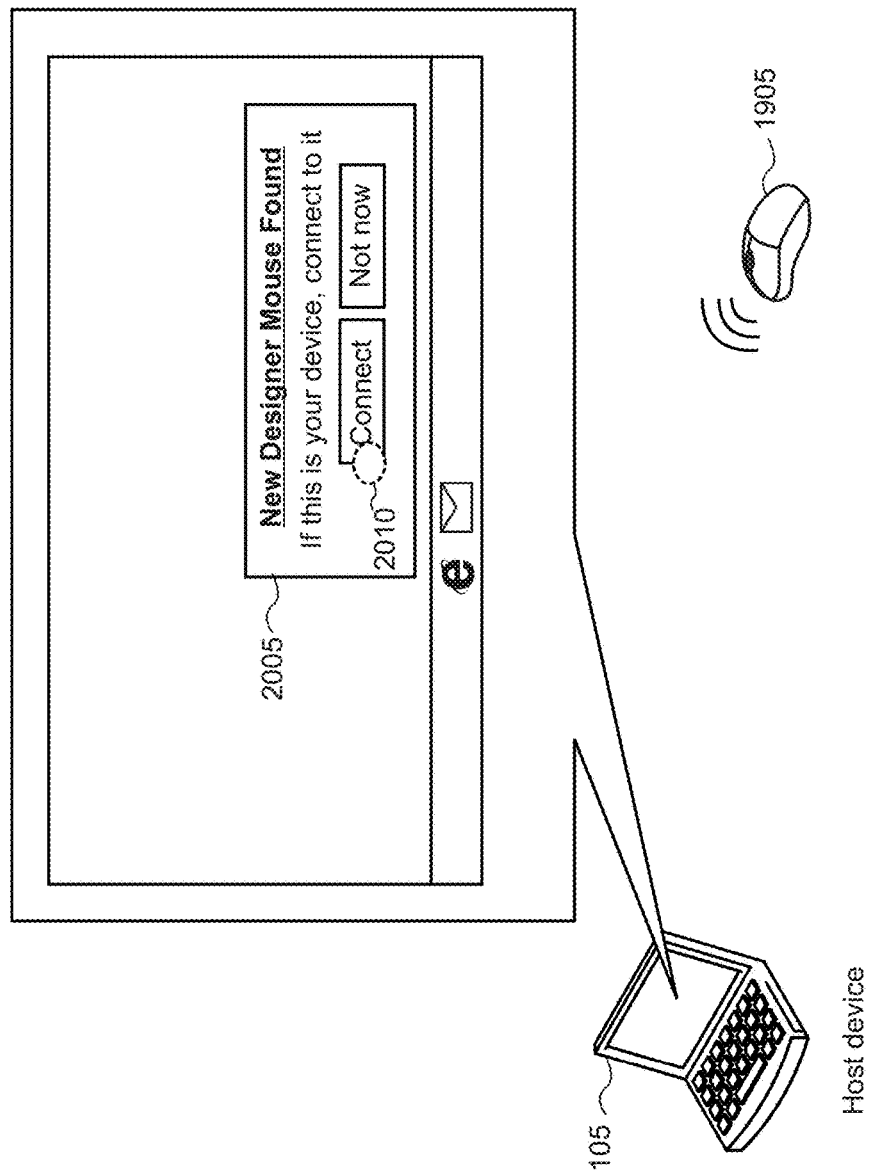

3100

3300

QUICK PAIR

CROSS-REFERENCE TO RELATED APPLICATIONS

This application claims benefit and priority to U.S. Provisional Application Ser. No. 62/590,164 filed Nov. 22, 2017, entitled "QUICK PAIR" which is incorporated herein by reference in its entirety. This patent application is related to co-pending application with a U.S. Ser. No. 15/859,099 entitled "PROXIMITY PLATFORM," filed contemporaneously herewith on Dec. 29, 2017, which claims benefit and priority to U.S. Provisional Application Ser. No. 62/590,022 filed Nov. 22, 2017, the entire contents of both applications are incorporated herein by reference in their entirety.

BACKGROUND

Host computing devices (e.g., smartphones, desktop computers, and laptops) utilize numerous wireless peripheral computing devices (e.g., speakers, mice, and keyboards) to provide additional features and experiences to users. Connection mechanisms and protocols between host and peripheral devices can vary, and at times the interaction with the host device can be burdensome to users even after a connection has been established. At times users navigate across multiple screens or settings in order to pair a host device with a peripheral device.

SUMMARY

A quick pair system instantiated on a host computing device and a peripheral computing device is utilized to quickly and easily pair devices over a point-to-point connection. The host device may utilize a proximity platform which is instantiated within its OS (operating system) and which allows services and applications to register patterns and centralize operations when peripheral devices broadcast an advertisement or connect to the host device. For example, individual patterns represent details about a peripheral device or operations or functions to perform when a particular peripheral device, category of peripheral devices, or group of peripheral devices connect to the host device or before the peripheral and host devices establish a connection. Groups or categories of peripheral devices can be broken down by manufacturer, type of device (e.g., speaker, headphones, keyboard, mouse, etc.), and other groups or categories.

When Bluetooth® technology is utilized (as opposed to other wireless connection protocols), an advertisement packet from the peripheral device is transmitted, broadcasted, or beaconed to the host device, which makes the peripheral device connectible. Upon the host device detecting the advertisement, the host device can choose to connect to the peripheral device or not. The advertisement includes fields, in octet or byte form, which include patterns within a payload of the advertisement that correspond to one or more registered patterns on the host device. The proximity platform examines the advertisement and based on detected correspondences between the received payload pattern and the registered patterns, the host device performs the requisite operations, functions, filters, and the like. Although scenarios can be triggered when the host and peripheral devices are presently connected, no connection is necessary for one or more scenarios to be triggered at the host device. In some implementations, quick pair can be considered a one-way channel for communication from the peripheral device to the host device, such that advertisements from respective peripheral devices are broadcasted without the peripheral device having any knowledge of the host device's configuration.

Quick pair is one implementation scenario supported by the proximity platform. For example, a laptop-host device recognizes an advertisement transmitted from a mouse-peripheral device when the advertisement payload is detected to be in range to the host device, and within the advertisement payload the laptop recognizes a pattern which indicates support for quick pair. The laptop automatically prompts a toast (e.g., a prompt or notification) on the UI (user interface) which provides the user with an option to pair the laptop with the mouse, or to postpone the pairing. Based on the user input, the laptop then pairs both devices or, in the event the user postpones pairing, the UI transfers the toast to an action center (e.g., notification center) which stores pending notifications for the OS. The toast will remain in the action center until the user selects the toast to pair the devices, cancels the toast, or the quick pair pattern is no longer detected such as when the peripheral device goes stale (e.g., turned off, out of range, quick pair removed from advertisement).

Using the proximity platform, quick pair causes the host device to implement scenarios or filters to execute the functions associated with quick pair. For example, a primary filter for quick pair may cause the laptop to monitor for broadcast beacons from peripheral devices, such as the mouse, in range of the host device as determined by the proximity platform.

In addition, the laptop may employ a secondary filter in which the laptop periodically tracks the presence of the mouse. Both the primary and secondary filters may use passive scanning, but the secondary filter operates by tracking an address within the advertisement. The laptop seeks to determine that the mouse is still within range or otherwise available to thereby verify the mouse has not gone stale and therefore been rendered useless to the laptop. This secondary filter may be applied after the primary filter has detected the peripheral device, but before the host and peripheral devices have been paired, or connected. For the purposes of quick pair, the secondary filter may not be concerned with exact locations or relative distance from the laptop, but rather assurances that the mouse is still active, within range, not switched off, etc. In the case of quick pair, the primary filter may not be dismissed so that it can continue detecting for quick pair enabled peripheral devices. The secondary filter may be dismissed when the peripheral device no longer needs to be tracked, such as when the devices are paired or no longer in range.

In another illustrative example, quick pair may cause a PC-host device (personal computer) which connects to a wireless fitness watch-peripheral device to download an application associated with the watch, automatically connect to the watch, and then register the user with the downloaded application, all within the quick pair ecosystem. Each performed action is based on a scenario and/or filter which was registered with the proximity platform for the event when the host device connects to the fitness watch. For example, the pattern within the payload of the transmitted advertisement from the watch corresponds to a registered pattern within the proximity platform, thereby causing the various operations discussed above.

Quick pair advantageously streamlines connection mechanisms for peripheral devices with host devices, without the need for users to navigate to a settings panel on the host device just to connect a device. Quick pair implemented with the proximity platform also concentrates and centralizes functions and filters for peripheral devices that various services within the host device may otherwise perform. This centralization within the OS of the host device saves battery life for the host device, system bandwidth, and processor and memory utilization so that all of these functions are performed by a single client, the proximity platform, within the OS. For example, battery life is saved in contrast to the alternative option in which tracking functionality is being performed but there is no centralization, such as at the proximity platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 17-18 show illustrative passive scanning performed for primary and secondary filters;

FIG. 19 shows an illustrative user interface (UI) for a host device in which a toast is surfaced to automatically configure the host device to quick pair with peripheral devices;

FIG. 20 shows an illustrative UI for a host device in which a toast is surfaced for a user to quickly connect to a mouse-peripheral device;

Like reference numerals indicate like elements in the drawings. Elements are not drawn to scale unless otherwise indicated.

DETAILED DESCRIPTION

Figure 1:
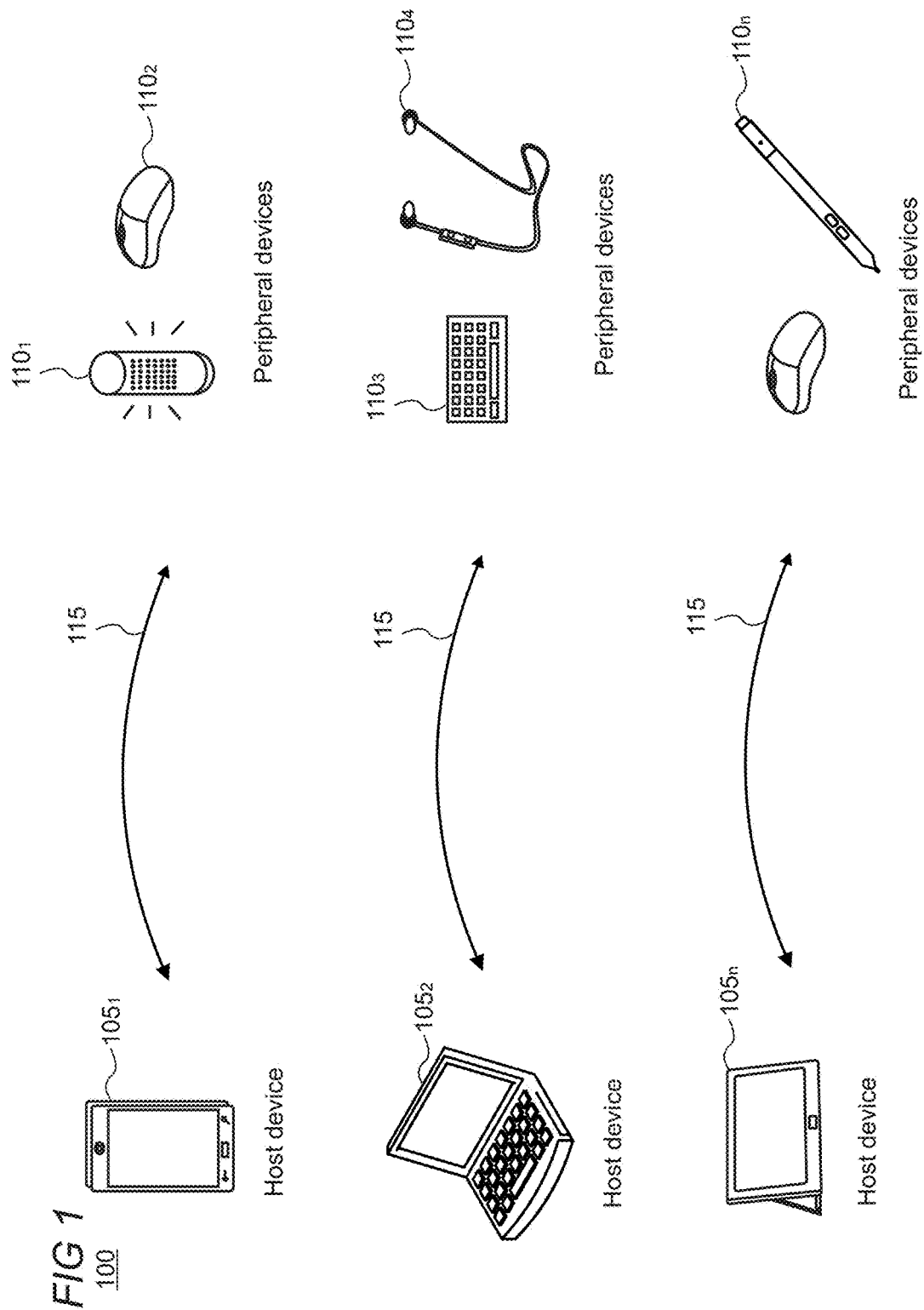
FIG. 1 shows an illustrative wireless connection among host devices and peripheral devices.

FIG. 1 shows an illustrative environment 100 in which various host devices 105 wirelessly connect with respective peripheral devices 110 (double arrowed lines indicate wireless connections as represented by numeral 115). In this example, the host devices depict smartphones, laptop computers, and tablet computers, but other host devices may also be utilized such as a personal computer (PC), game console, and wearable computing devices such as head-mounted displays. The host devices may be used by users to make and receive voice and/or video calls, engage in messaging (e.g., SMS/MMS) and e-mail communications, use applications, play or stream music, movies, and other multimedia, access services that employ data, browse the World Wide Web, and the like.

The peripheral devices 110 depicted in FIG. 1 and paired with respective host devices 105 include various wireless devices including a Bluetooth® speaker, mouse, keyboard, headphones, and a stylus pen configured for use with a touchscreen display. Other wireless peripheral devices not shown in FIG. 1 may also be utilized with the present quick pair, including remote controls, video game controllers, and chargers. In addition, certain host devices may be considered peripheral devices in some scenarios. For example, a smartphone may be considered a peripheral device when connected to a PC, such as when the smartphone seeks to upload multimedia (e.g., pictures) to the PC for backup. In some scenarios the operations performed between the two devices may dictate the assignment of host (master) and peripheral (slave) devices.

Figure 2:
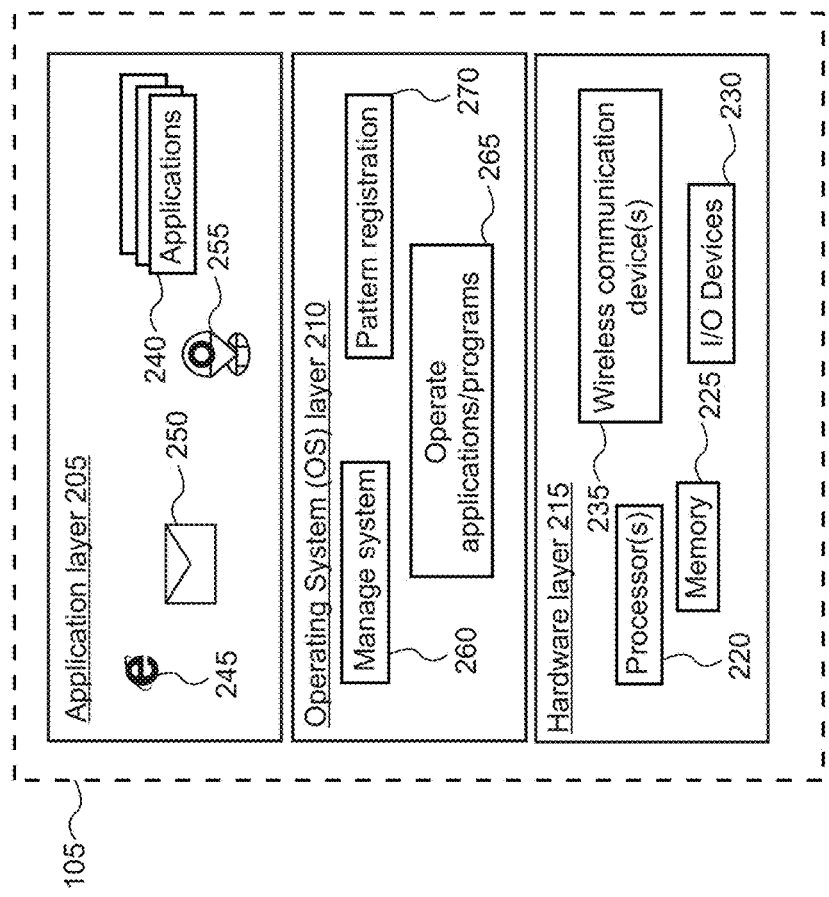
FIG. 2 shows an illustrative architecture of a host computing device.

FIG. 2 shows an illustrative layered architecture 200 of a host computing device 105. The architecture 200 is typically implemented in software, although combinations of software, firmware, and/or hardware may also be utilized in some cases. The architecture is arranged in layers and includes an application layer 205, an OS (operating system) layer 210, and a hardware layer 215. The hardware layer 215 provides an abstraction of the various hardware used by the host device 105 (e.g., input and output devices, networking and radio hardware, etc.) to the layers above it. In this illustrative example, the hardware layer supports processor(s) 220, memory 225, input/output devices (e.g., mouse, keyboard, display) 230, and a wireless communication device 235.

The wireless communication device 235, or transceiver, can include any range of technologies that support the transmission and reception of data over waves, including classic Bluetooth® (e.g., Enhanced Data Rate (EDR)), Bluetooth LE (Low Energy), NFC (Near Field Communication), and Wi-Fi. These various wireless connection devices can transmit and receive data over waves, such as radio waves, and do so at particular frequencies according to the protocol for the particular technology. Bluetooth, for example, utilizes 2.4 GHz radio frequency to transmit and receive data among two or more devices, and Wi-Fi can utilize a radio frequency of 2.4, 3.6, or 5.0 GHz.

The wireless communication device 235 can transmit and receive data in the form of, for example, radio waves, in which the device translates the data into radio waves for transmission or breaks down the radio waves into data upon receipt. The wireless communication device may be operatively connected to the processor which transmits data from and to the wireless communication device. The wireless communication device can also monitor signal strength of a connection with a peripheral device in addition to beacons. In one example, the device can monitor beacons when the peripheral device is not connected and monitor connection when the peripheral device is connected. The proximity platform is designed to handle both cases.

The application layer 205 in this illustrative example supports various applications 240, including a web browser 245, e-mail application 250, maps application 255, etc. Although only certain applications are depicted in FIG. 2, any number of applications can be utilized by the device, including calendar, contacts, news, fitness, etc. The applications are often implemented using locally executing code. However in some cases, these applications can rely on services and/or remote code execution provided by remote servers or other computing platforms such as those supported by a service provider or other cloud-based resources (not shown).

The OS layer 210 supports, among other operations, managing system 260, operating applications/programs 265, and pattern registration 270. The OS layer may interoperate with the application and hardware layers in order to perform various functions and features. Furthermore, although pattern registration is shown as a component within device 105, it may alternatively be, in whole or in part, instantiated on a remote server and communicate with the host device 105 over a network (not shown). The network can include any number of connections which the device and service are a part of, such as a personal area network, local area network, wide area network, the Internet, or the World Wide Web.

Figure 3B:
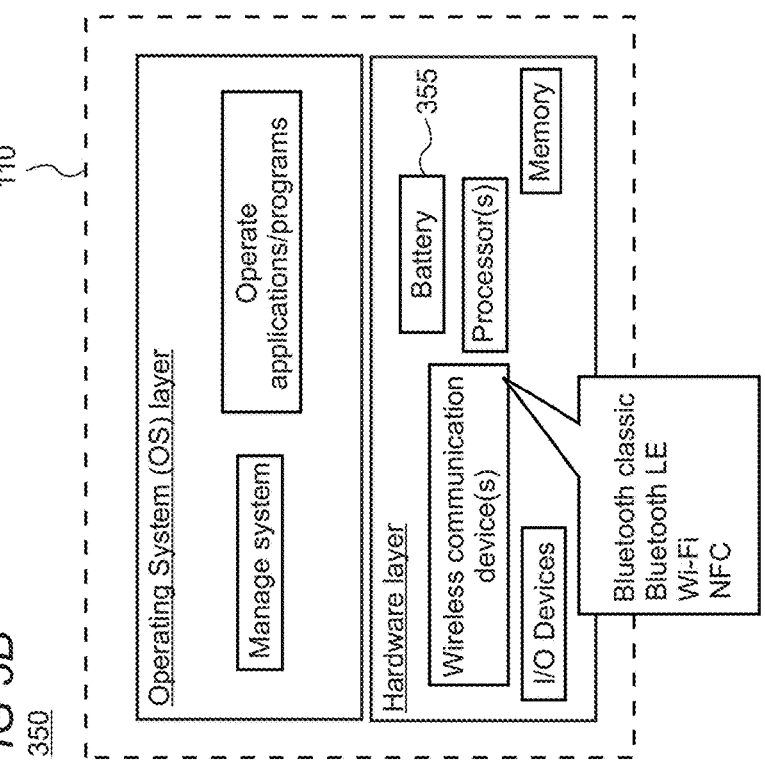
FIGS. 3A-B show illustrative schematics of peripheral computing devices.
Figure 3A:
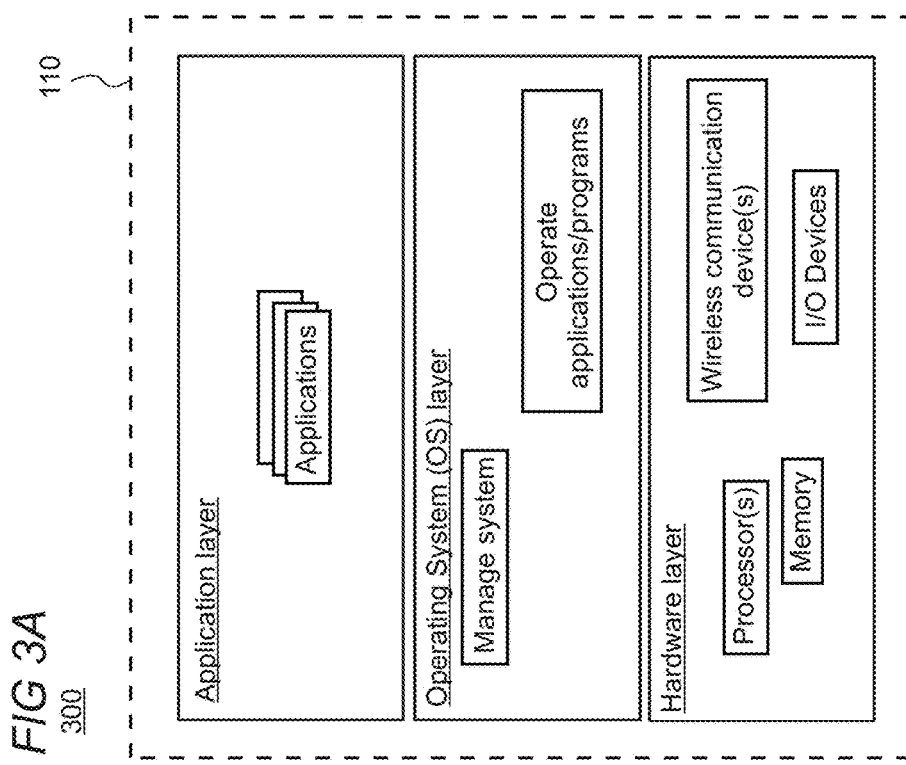

FIGS. 3A and B show illustrative layered architectures 300 and 350, respectively, of peripheral devices 110. Peripheral devices may be more complex devices as shown in FIG. 3A, with similar components as the host device as discussed above, or may be more candid and simplistic as depicted in FIG. 3B. The various layers and components within FIGS. 3A and B may operate similarly to the layers and components discussed above with respect to the host device of FIG. 2.

Turning to FIG. 3A, more complex devices can include, for example, a smartphone which operates as the peripheral (or slave) device when connected to a laptop computer (master device). As another example, a pair of headphones can include more complex features than typical headphones and thereby utilize various layers within the architecture depicted in FIG. 3A. For example, headphones with noise-cancelling capabilities and other complex functions may require additional components, applications, and the like.

On the other hand, the system depicted in FIG. 3B may be more compact for simplistic peripheral devices without the need for complex operations. For example, a keyboard may include a controller (or processor) dedicated for recognizing key strokes and transmitting the various key strokes and user inputs to the computer. In this scenario, the processor may communicate with the wireless communication device which transmits the various inputs to the host device.

If the keyboard is wireless, a battery 355 may provide the processor and other components with voltage to operate. Although the battery is only shown with respect to FIG. 3B, each system architecture depicted in FIGS. 2 and 3A may likewise include a battery or some direct power source. FIG. 3B also depicts exemplary non-exhaustive wireless communication technologies which a peripheral device can employ, including Bluetooth classic, Bluetooth LE, Wi-Fi, and NFC.

In order to establish a connection, such as using Bluetooth LE, a peripheral device 110 may beacon, broadcast, or otherwise transmit an advertisement packet. From here, the host device may detect the advertisement using the wireless communication device 235. If the advertisement is recognized by the wireless communication device 235, then in some systems, the wireless communication device delivers the signals to the OS for the host device for handling, in which the OS may forward the received data in the advertisement to one or more services or applications to perform various operations. In this scenario, multiple services may occupy system resources to perform identical tasks, such as monitor for the connection of the peripheral device. This takes up system resources by consuming battery power, duplicative effort across services, and processing power.

Figure 4:
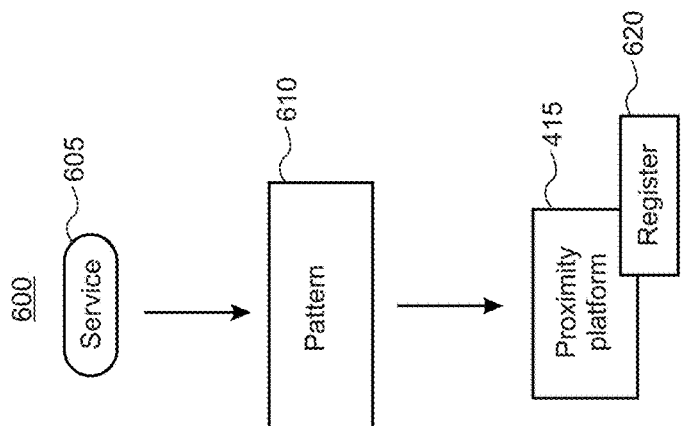
FIGS. 4-6 show illustrative environments in which services register patterns with a proximity platform.
Figure 5:
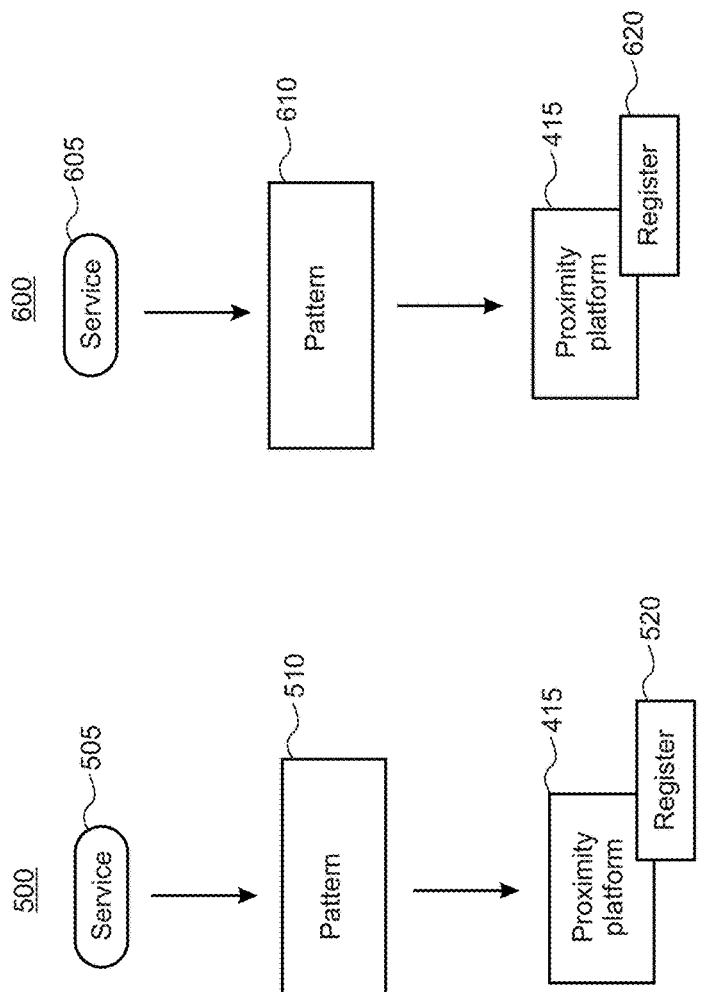
Figure 6:
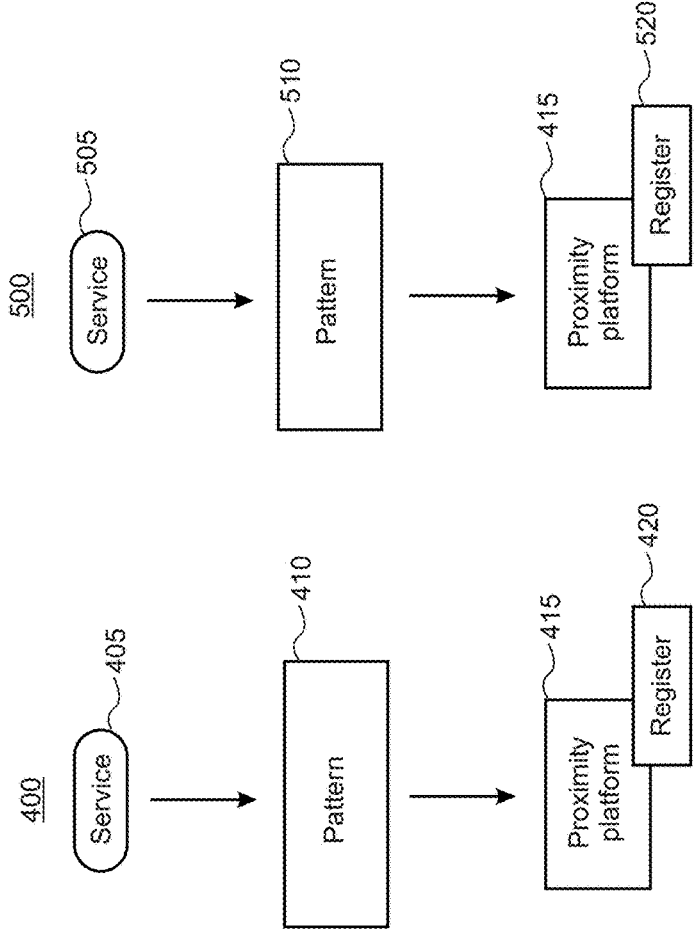

FIGS. 4, 5, and 6 show illustrative environments 400, 500, and 600, respectively, in which each service registers a pattern to a proximity platform 415 to execute various scenarios, filters, and functions. Services 405, 505, and 605 each register (as indicated by numerals 420, 520, and 620) respective patterns 410, 510, and 610 with proximity platform 415. The proximity platform may be exposed on both the OS and the wireless communication device, so that both are properly configured to detect patterns and perform corresponding functions.

The respective patterns can utilize pre-set patterns that are instantiated on the host device 105, such that each pattern represents particular information that is decipherable and comprehended by the host device. Thus, received advertisements from peripheral devices can correspond to registered patterns, thereby causing the host device to automatically comprehend details about the connected peripheral device and automatically perform functions for that particular peripheral device.

Quick pair is one use and implementation around the proximity platform ecosystem. The various services registering with the proximity platform centralize all processing in a single location (i.e., the proximity platform) within the OS and the utilized wireless communication device of the host device, instead of having multiple services monitor for particular peripheral device connections. Centralizing the processing at the proximity platform saves battery life, processing power, and bandwidth associated with the computing device, and can ultimately prolong the life of a single battery charge due to the savings in resources.

Figure 7:
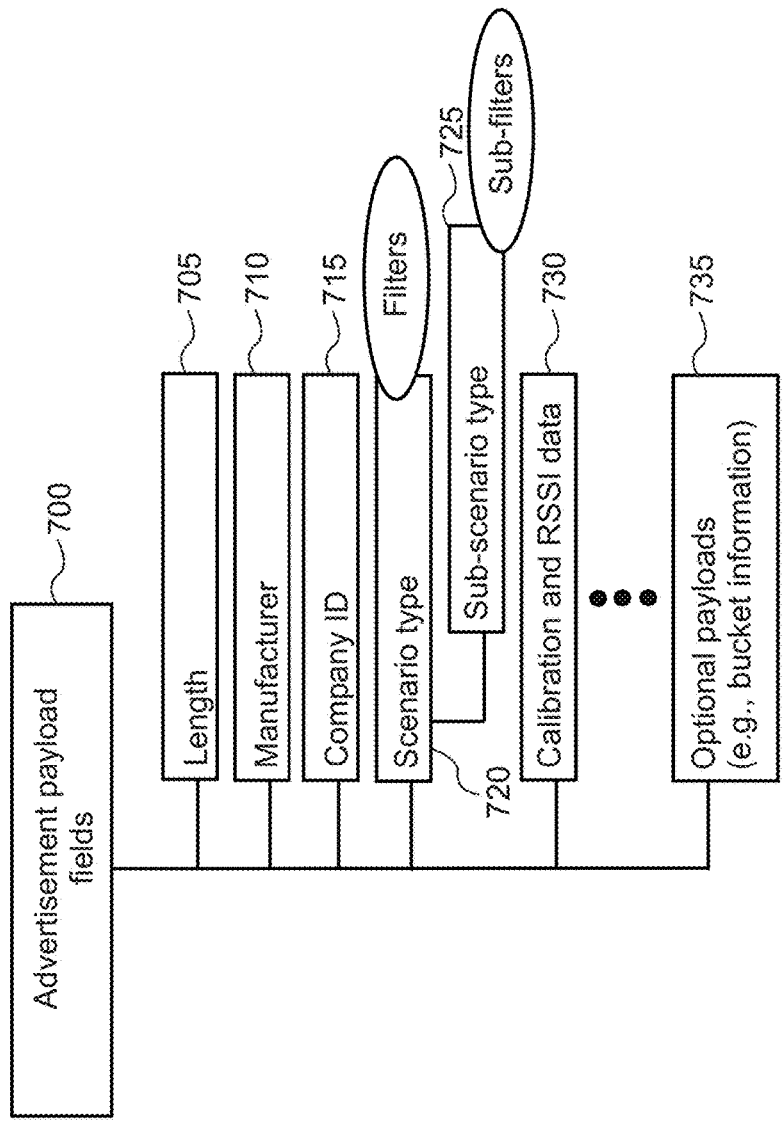
FIG. 7 shows an illustrative taxonomy of fields associated with an advertisement payload packet for a Bluetooth® transmission from a peripheral device.

FIG. 7 is an illustrative taxonomy of fields 700 associated with an advertisement payload transmitted from a peripheral device 110. The various fields can be filled with bytes or octets of information which form a complete pattern. The pattern, which is ultimately received by the host device, can provide particular details of information about the peripheral device, functions and operations which the host device performs, and scenarios and filters which the host device applies, assuming both devices support the proximity platform protocols and underlying technology. The transmitted patterns may correspond to the registered patterns at the proximity platform from the respective services, as discussed with respect to FIGS. 4-6.

The taxonomy of fields 700 within the advertisement can include length 705, manufacturer 710, company ID 715, scenario type (e.g., using filters) 720, sub-scenario type 725 (e.g., using sub-filters), calibration and RSSI data 730, and optional payloads 735 (e.g., bucket information). Although filters and sub-filters are shown as examples with the scenarios, filters and sub-filters are just one example in which the host device implements a scenario. For example, a filter can be implemented with a sub-scenario, and a sub-filter can be implemented with a filter. The configuration of the scenarios and filters may ultimately be determined based on the desired functions for the host device when the peripheral device beacons or connects to the host device.

Additionally, each respective field can take up one or multiple fields within a payload depending on the overall configuration of the system with which the particular service registers its pattern and the host and peripheral device interact. For example, RSSI data 730 may use multiple fields to transmit data if the calibration techniques change or are found to be more or less efficient in a different manner.

Figure 8:
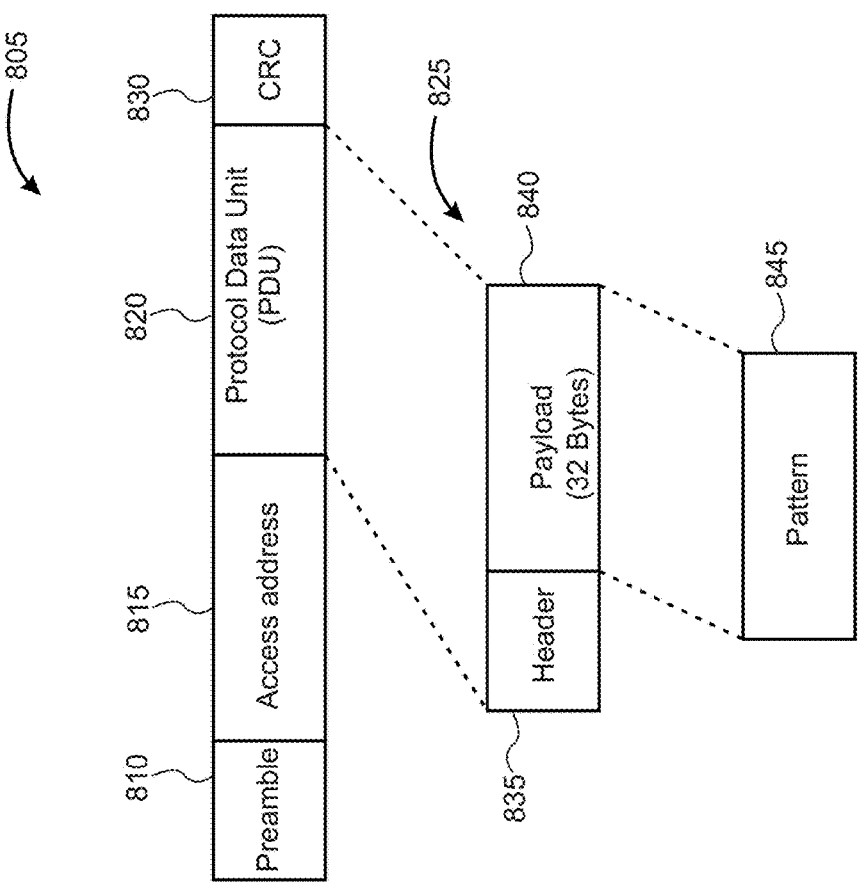
FIG. 8 shows an illustrative diagram of a data packet associated with a Bluetooth transmission.

FIG. 8 is an illustrative diagram 800 of a Bluetooth data packet 805 which peripheral devices 110 transmit to host devices 105. The data packet 805 includes various fields which serve different purposes and provide different information to the host device. The data within each respective field can be comprised of a prescribed number of one or more bytes (or octets), in which each peripheral device adheres to a particular structure following the Bluetooth protocol.

A preamble 810 can be used for internal protocol management, such as synchronization and timing estimation at the receiving host device. An access address 815 can identify a connection between the host and peripheral devices to reduce the possibility of data packet collisions among different wireless connections. The PDU (Protocol Data Unit) 820 field carries the header 835 and payload 840 which contains the data for the advertisement packet data 825. The CRC (Cyclic Redundancy Check) 830 is an error-detecting code used to validate the packet for unwanted alterations, which can be used to ensure data integrity for wirelessly transmitted data packets.

The header 835 of the PDU field describes the packet type and the PDU type which can define the purpose of the peripheral device. For example, the PDU type can indicate the peripheral device is a connectable undirected advertising event, non-connectable undirected advertising event, scannable undirected advertising event, etc. The payload 840 which also forms part of the PDU field 820 can be variably sized and describes a unique pattern 845 for the given scenario, such as the peripheral device and the actions which the host device will perform.

Figure 9:
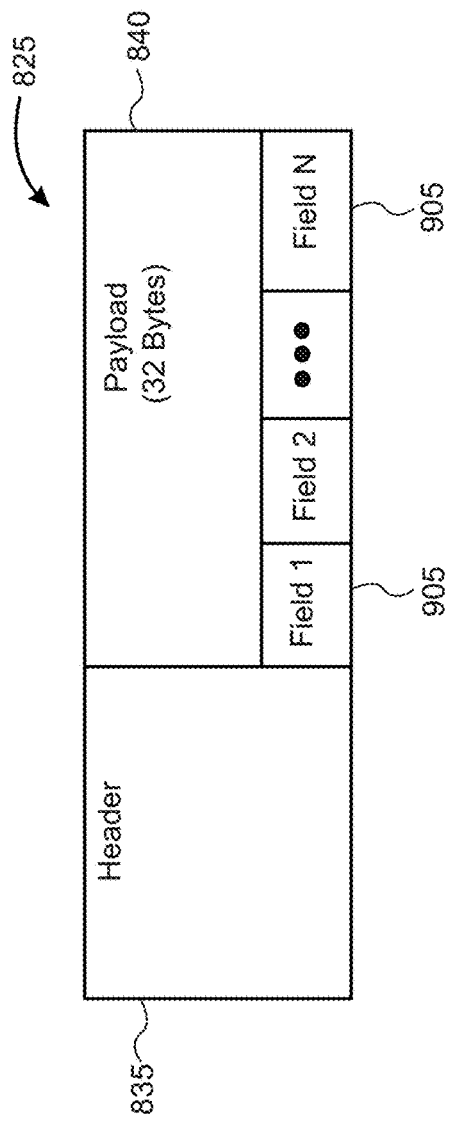
FIG. 9 shows illustrative fields associated with a payload of an advertisement within the protocol data unit of the data packet.
Figure 10:
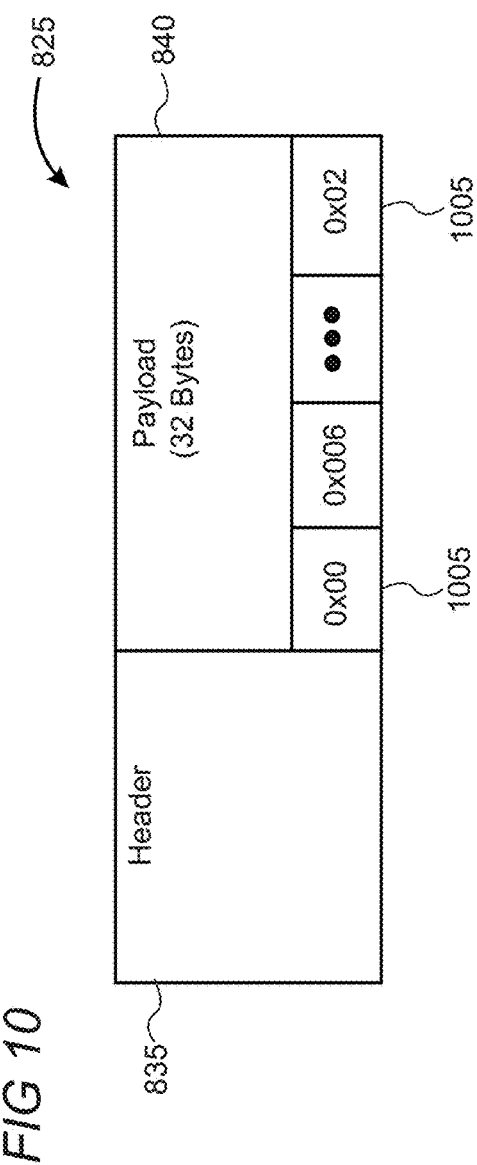
FIG. 10 shows an illustrative payload of the advertisement in which the fields contain exemplary patterns.

The payload includes a series of integers for sets of bytes that form patterns which indicate particular actions for the host device 105 to perform. For example, FIG. 9 depicts an illustrative structure of an advertisement data packet 825 which includes the header 835 and payload 840. The payload in this example contains 32 bytes, but based on the utilized Bluetooth version and the individual scenario, more or less bytes can also be utilized for the payload. The payload 840 includes fields 905 as representatively shown from Fields 1-N. FIG. 10 shows an illustrative advertisement packet 825 in which the fields 1005 include integers, each one of which indicates to the host device information about the peripheral device, one or more actions to perform, or one or more filters to apply.

Figure 11:
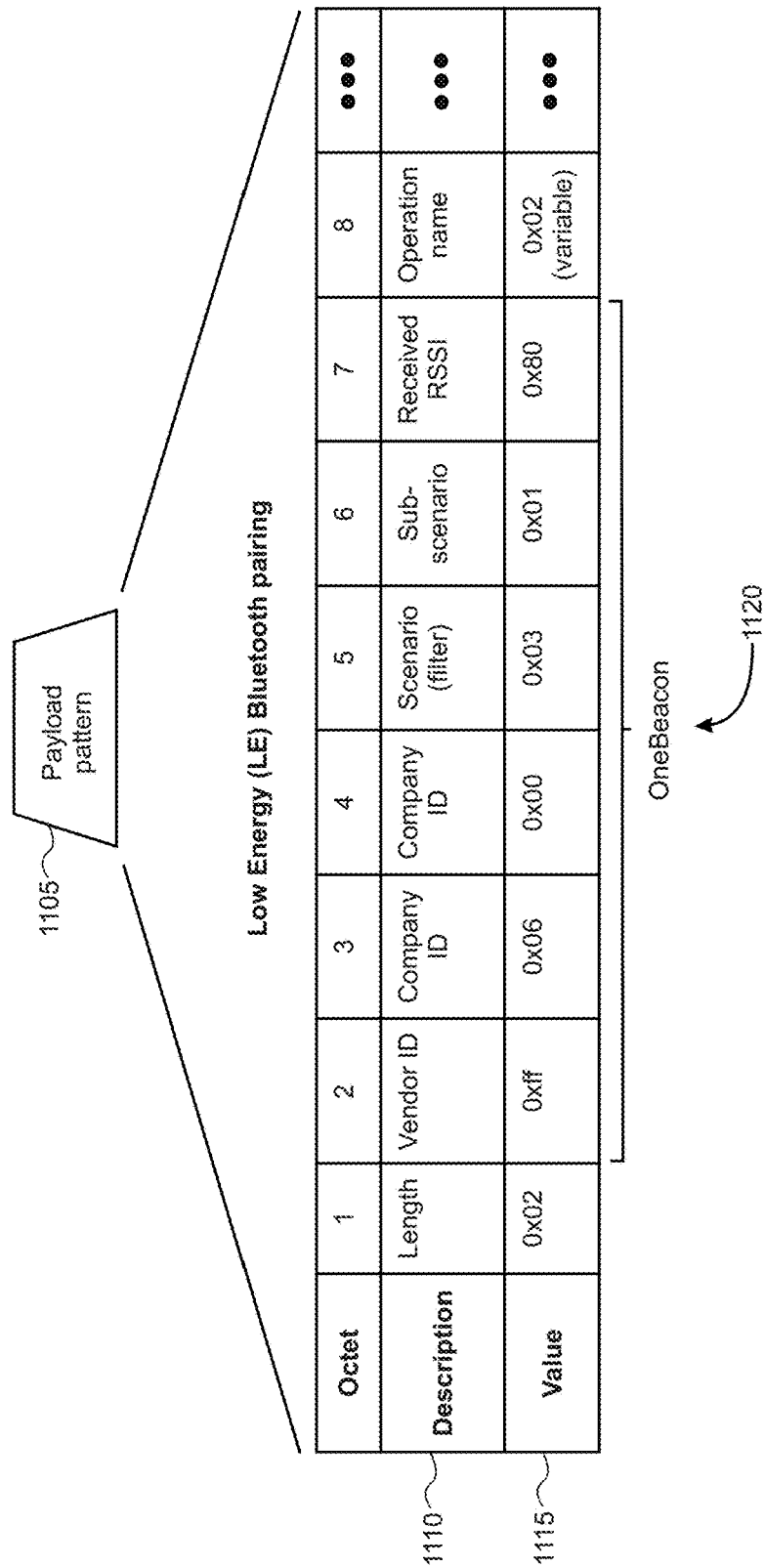
FIG. 11 shows an illustrative advertisement pattern associated with LE (Low Energy) Bluetooth pairing.
Figure 12:
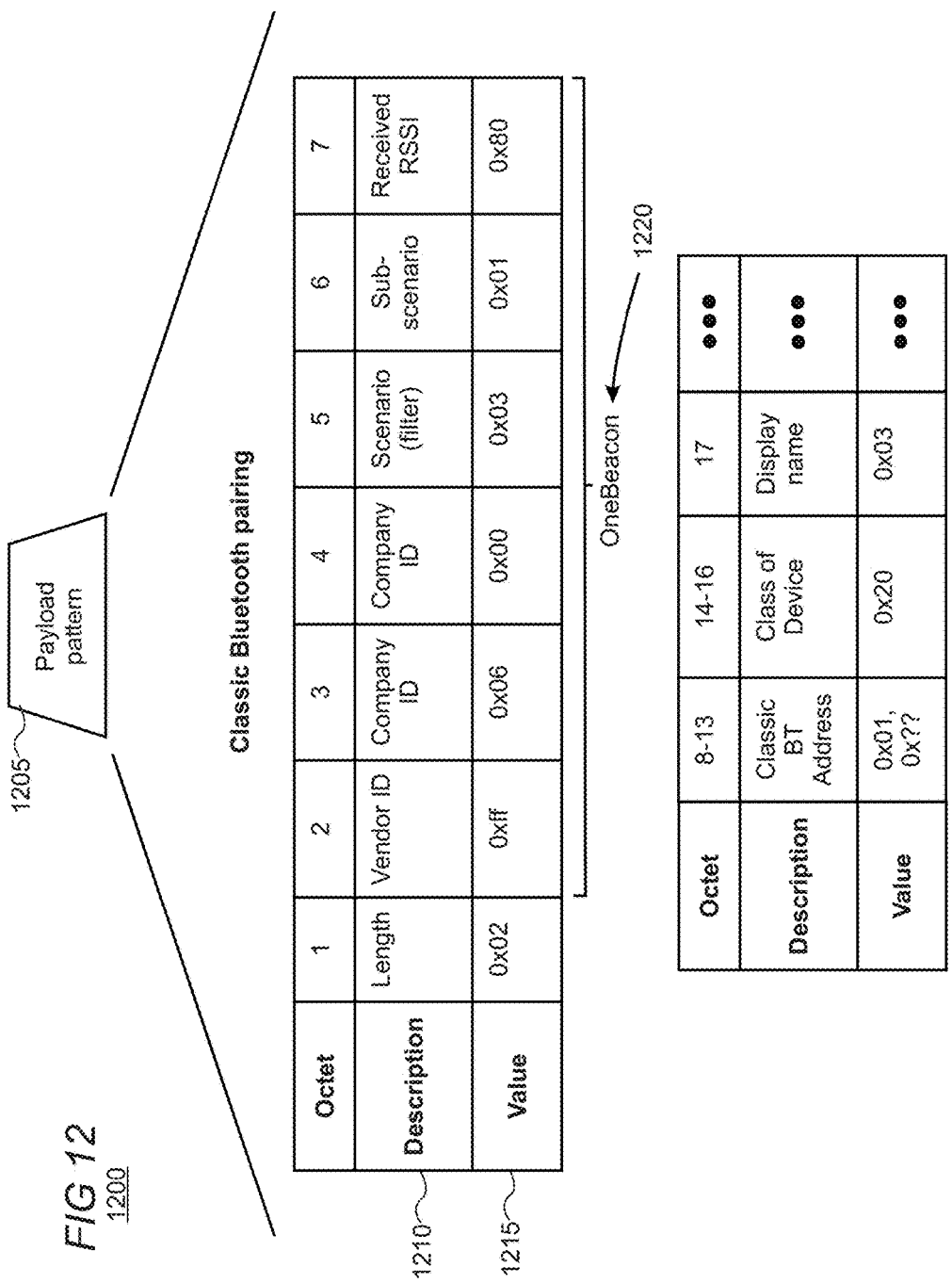
FIG. 12 shows an illustrative advertisement pattern associated with classic Bluetooth pairing.

FIGS. 11 and 12 show illustrative advertisement packets 1100 and 1200, respectively, with unique patterns 1105 and 1205, in which advertisement packet 1100 may be configured for LE (Low Energy) Bluetooth pairing, and advertisement packet 1200 may be configured for classic Bluetooth pairing, such as using EDR (Enhanced Data Rate). As depicted in FIGS. 11 and 12, the payload of the advertisement packet can include multiple fields, each of which corresponds to a particular respective description 1110 and 1210 and value 1115 and 1215.

Each value associated with the respective field provides specific information as detailed in the description fields 1110 and 1210 (e.g., length, vendor ID, company ID, scenario, received RSSI calibration, etc.). Although particular octets are illustrated in FIGS. 11 and 12, other variations are also possible. For example, certain fields may be removed and additional octets can be given to, for example, the scenario field. So long as bytes are still available, additional fields can be created or given to a particular description or other purpose. For non-connected peripheral devices (broadcasting advertisement or beacons), the advertisement fields can be used as patterns. For connected peripheral devices, additional information can be retrieved using Bluetooth GATT (Generic Attributes) database or L2CAP (Logical Link Control and Adaptation Protocol) service connections to customize the proximity scenario.

OneBeacon (represented by reference numerals 1120 and 1220), may indicate a particular scenario between the host and peripheral devices. The OneBeacon protocol is the payload format structure used which provides an entry or first level indication to the host device for the scenarios and sub-scenarios that are used. Thus, the proximity platform implements a OneBeacon scenario, which indicates to devices to implement particular scenarios and sub-scenarios, which from there can result in the host device executing particular filters and sub-filters. In the examples contained in FIGS. 11 and 12, OneBeacon is indicated through fields 2-7, but OneBeacon can alternatively be indicated using less fields (e.g., one or two fields), or more fields. Although in the present situation and as applied to quick pair, OneBeacon is utilized, the proximity platform can ultimately operate without the indications of the OneBeacon format. OneBeacon is but one example of an entry level implementation into the scenario and sub-scenario endeavors, but other customizations of the fields (e.g., vendor and company ID fields) can result in a different scenario separate from OneBeacon.

If the peripheral device detects that the host device does not support (e.g., is not configured to, does not participate in)

the OneBeacon protocol with the executable filters and sub-scenarios, the peripheral device still performs the normal pairing mode without the filters and sub-scenarios. Thus, the OneBeacon indicates to the host and peripheral devices that each device is configured with fields for the proximity platform and quick pair, or to otherwise perform the original pairing mode without scenarios, sub-scenarios, and filters.

Figure 13:
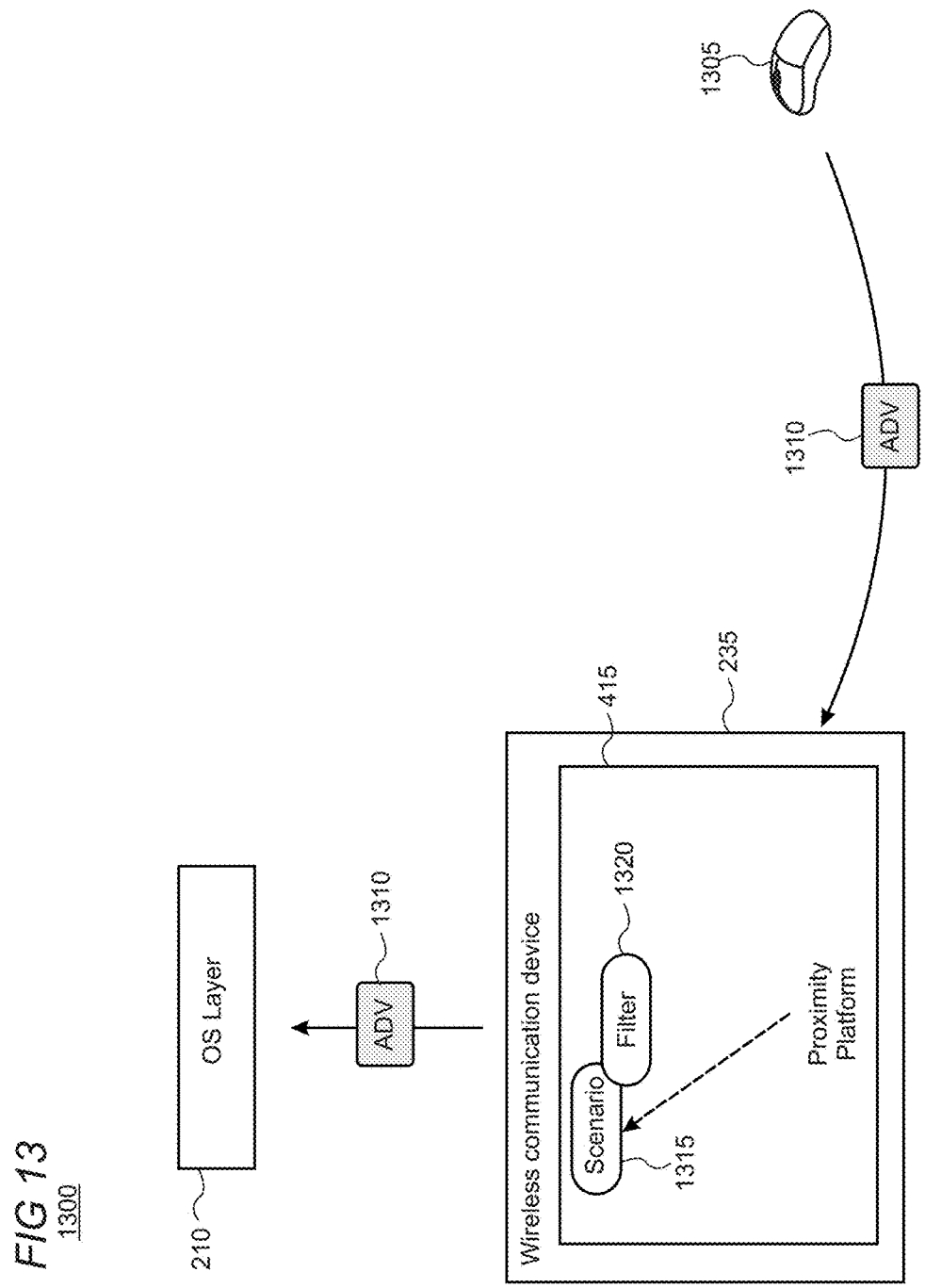
FIG. 13 shows an illustrative operation by a host device upon receiving an advertisement packet from a mouse-peripheral device.
Figure 14:
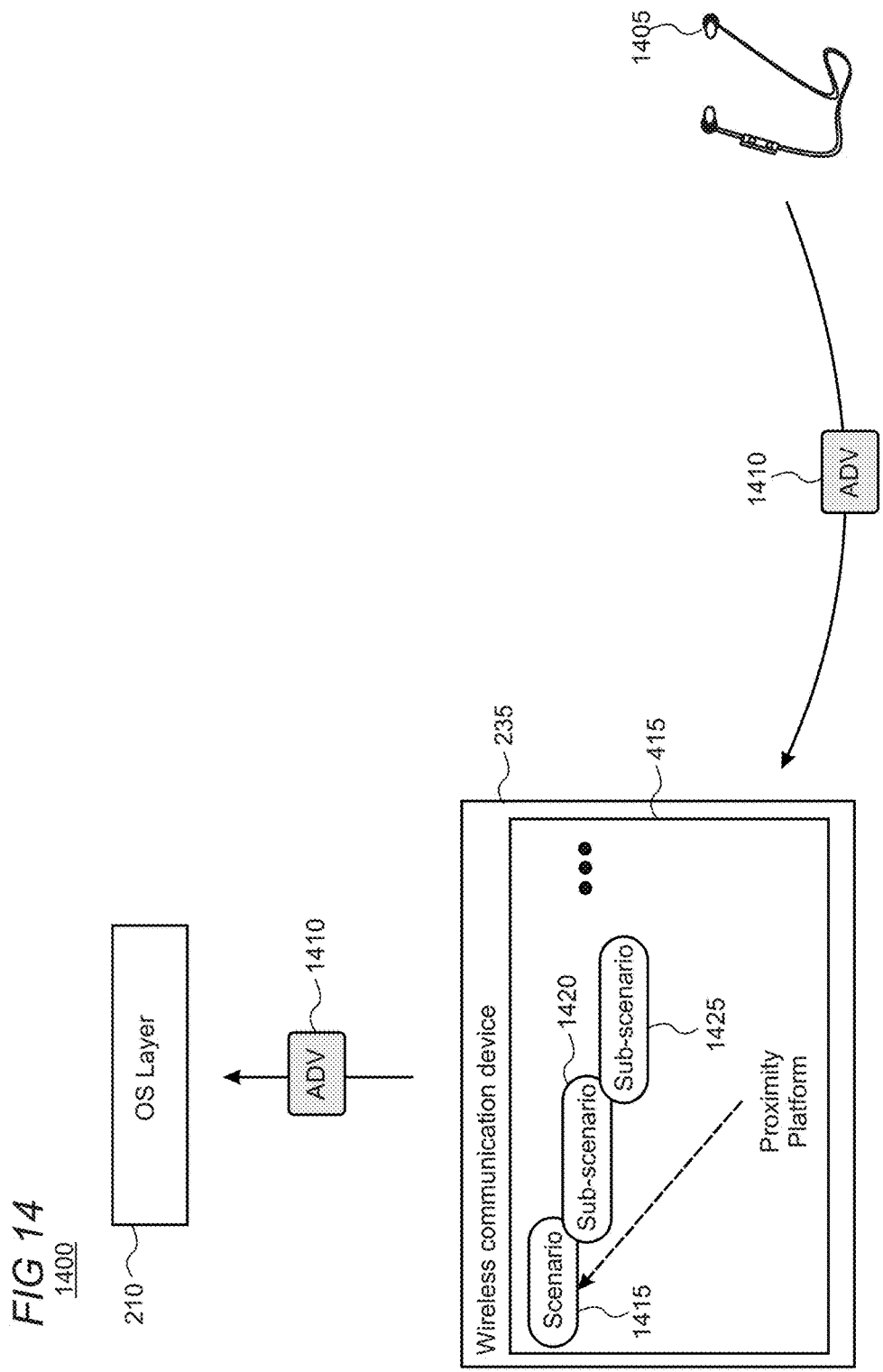
FIG. 14 shows an illustrative operation by a host device upon receiving an advertisement packet from a headphones-peripheral device.

FIGS. 13 and 14 show respective illustrative environments 1300 and 1400 in which the proximity platform for the host device handles scenarios and filters depending on the services and applications that are registered with the proximity platform. For example, in environment 1300 in FIG. 13 a mouse 1305 (the peripheral device in this example) transmits an advertisement 1310 according to the OneBeacon protocol to the wireless communication device 235 associated with the host device 105. The particular scenarios and filters applied depend on and correspond to the pattern from the advertisement (FIGS. 11 and 12).

In this example, the proximity platform 415 of the wireless communication device recognizes the advertisement as a communication that the OS can utilize, such as by detecting scenario 1315 and an applied filter 1320. From here, the wireless communication device forwards the advertisement to the OS for handling. In this regard, the proximity platform can serve as a client instantiated on the wireless communication device and the OS. Without the proximity platform, the OS layer may typically forward the recognized advertisements to particular services or applications on the host device for handling. In contrast, the proximity platform is a centralized platform to carry out various tasks.

FIG. 14 provides another exemplary environment 1400 in which a pair of headphones 1405 (the peripheral device in this example) transmits an advertisement 1410 to the wireless communication device 235 associated with the host device 105. In this example, the proximity platform detects a single scenario 1415, and sees there are associated sub-scenarios 1420 and 1425 for the host device to perform for this particular peripheral device, that is, the headphones.

The differing functions between the examples in FIGS. 13 and 14 may be attributed to different patterns within the advertisement packet payloads. For example, in FIG. 13 the host device may wish to surface a notification on the UI to quickly enable the user to connect to the mouse. In contrast, in FIG. 14 the host device may wish to initiate a music application, automatically play music, and execute other scenarios and associated filters that may be utilized and convenient for the user upon connecting the headphones.

Figure 15:
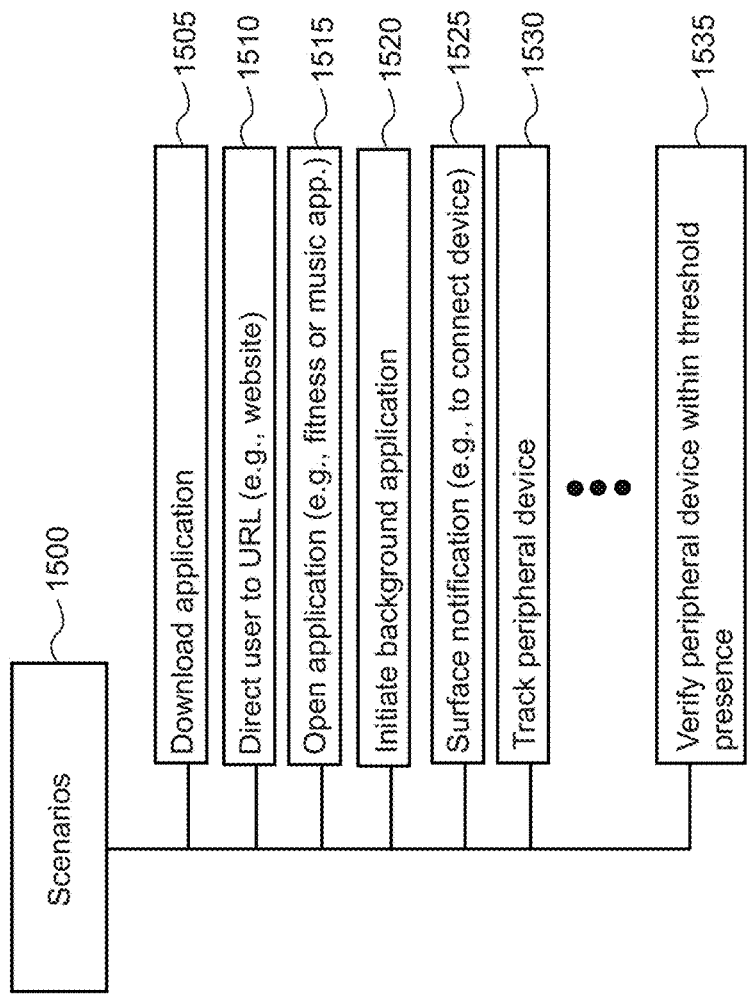
FIG. 15 shows an illustrative taxonomy of scenarios in which a host device can perform.

FIG. 15 shows an illustrative taxonomy of scenarios 1500 which the host device can perform upon connecting with or receiving an advertisement from a peripheral device. Although particular scenarios and functions are depicted in FIG. 15, the list is non-exhaustive and other filters and scenarios may also be performed. Exemplary scenarios and filters performable by the host device include download applications 1505, direct user to URL (e.g., website, local/remote folder) 1510, open one or more applications (e.g., fitness or music app.) 1515, initiate one or more background applications 1520, surface notification (e.g., to connect device) 1525, track peripheral device (e.g., its location relative to the host device) 1530, and verify peripheral device is within a threshold presence to the host device 1535.

The threshold presence can be, for example, that the peripheral device is within range to and detectable by the host device. For example, the threshold presence may be the maximum distance for the peripheral device to be from the host device even if the device is not fully operational (e.g., there is delay or connectivity issues). Alternatively, threshold presence may be that the peripheral device is within operational distance to the host device, such that the distance is the maximum distance for the host and peripheral devices to interact while still operating properly and with little to no connectivity issues, lag, interruptions, etc.

Figure 16:
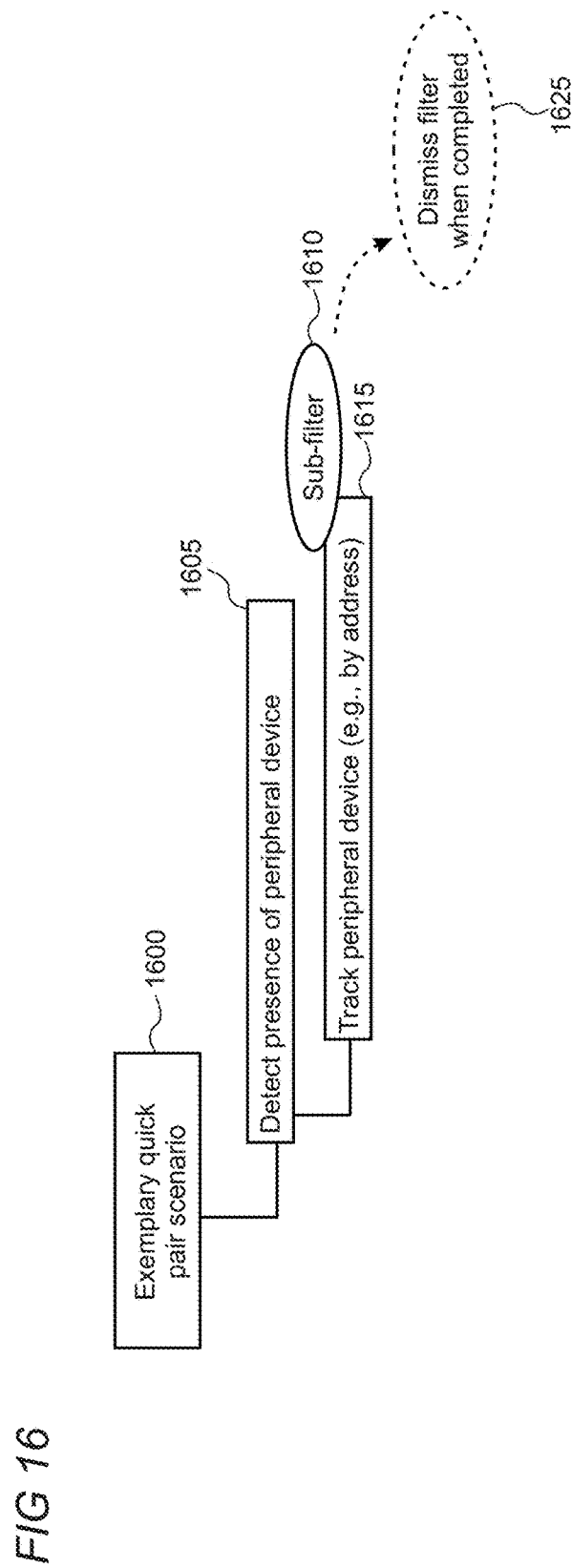
FIG. 16 shows an illustrative quick pair scenario in which a host device can perform.

FIG. 16 shows an exemplary quick pair scenario 1600. In this example, the host device may detect a presence for one or more peripheral devices 1605, which may be implemented as a primary filter. Once the presence is detected, the secondary filter (or sub-filter 1610) tracks the detected peripheral device according to the payload address 1615. Once the host and peripheral devices are paired, or connected, the secondary filter of tracking can be dismissed (as represented by numeral 1625) since it is no longer necessary. However, the host device may continue executing the primary filter to detect other peripheral devices.

Tracking may include verifying an estimated distance for the peripheral device or associating the peripheral device with a particular category that represents distal parameters. For example, distal parameters can include particular categories that indicate a relative distance of the peripheral device from the host device. These categorical representations can be used so the host device can continue using or relying on the peripheral device without fear that the peripheral device is out of range, no longer active, no longer switched on, or the like. The distance, or estimated distance, can be determined using an RSSI value determined by the host device, where the RSSI value is associated with the peripheral device's advertisement transmission. The distance or estimated distance can be determined as discussed in co-pending application with a U.S. Serial No. of Ser. No. 15/859,099 entitled "PROXIMITY PLATFORM", filed contemporaneously herewith on Dec. 29, 2017, which claims benefit and priority to Provisional Application Ser. No. 62/590,022 filed Nov. 22, 2017, the contents of both applications are hereby incorporated herein by reference in their entirety.

FIGS. 17 and 18 show illustrative primary and secondary filters which the host device 105 may apply when implementing quick pair. For example, the host device may implement a passive scan 1705 for peripheral devices as the primary filter 1710. The passive scan is a scan in which the wireless communication device performs the scanning and the host device does not open and analyze the advertisement packet. In addition, with passive scanning, the host device may not send requests to the peripheral device for each broadcast packet that it receives in order to respect the privacy of the host device. Although passive scanning is depicted in FIGS. 17 and 18, different modes can be used between different levels of filters depending on the underlying wireless protocol/technology utilized.

The passive scan can be employed for the primary filter in order to initially detect the presence of the peripheral device that supports quick pair, that the peripheral device is in range, and that it is in pairing mode. From here, tracking of the peripheral device is initiated. For example, the primary filter may cause the host device to receive various information within the advertisement packet as shown in FIGS. 11-12, including calibrated RSSI information, vendor ID, company ID, and the like.

After the host device has various information relating to the peripheral device, the host device 105 may implement a secondary filter 1810 which also utilizes a passive scan 1805 to verify the continued presence of the peripheral device 110. The passive scan for the secondary filter may look at the address of the advertisement in order to verify the peripheral device's presence. The passive scan may occur periodically, such as every second, ten seconds, 30 seconds, etc., in order for the wireless communication device to pick up the beaconed advertisement. This way the host device can track and verify the presence of the peripheral device in case the peripheral device goes stale, that is, switches off, is out of range, is inactive, the quick pair payload was removed from the advertisement, etc.

FIGS. 19-26 show illustrative scenarios in which quick pair is utilized according to the proximity platform. Referring first to FIG. 19, wireless mouse 1905 transmits or beacons a Bluetooth quick pair advertisement, which when in range of the host is picked up by the laptop-host device 105. According to the quick pair protocol, the laptop follows a scenario which prompts a toast 1910 on the UI of the laptop upon recognizing the quick pair pattern within the mouse's advertisement. The toast may only be shown once, such as the first time the OS detects the quick pair advertisement, in which case the toast is to obtain consent from the user and onboard him to quick pair.

The toast asks the user whether or not he would like to subscribe to quick pair features in the future. By selecting "keep on" the user thereby subscribes to quick pair for all future connections with peripheral devices that have a payload pattern configured with quick pair. By selecting "no thanks" the user would have to manually go to Bluetooth settings in order to connect to the mouse. In this scenario, the user selects "keep on" as represented by input 1915. The input can be in the form of touch for a touch screen display, clicking a mouse, etc.

Figure 21:
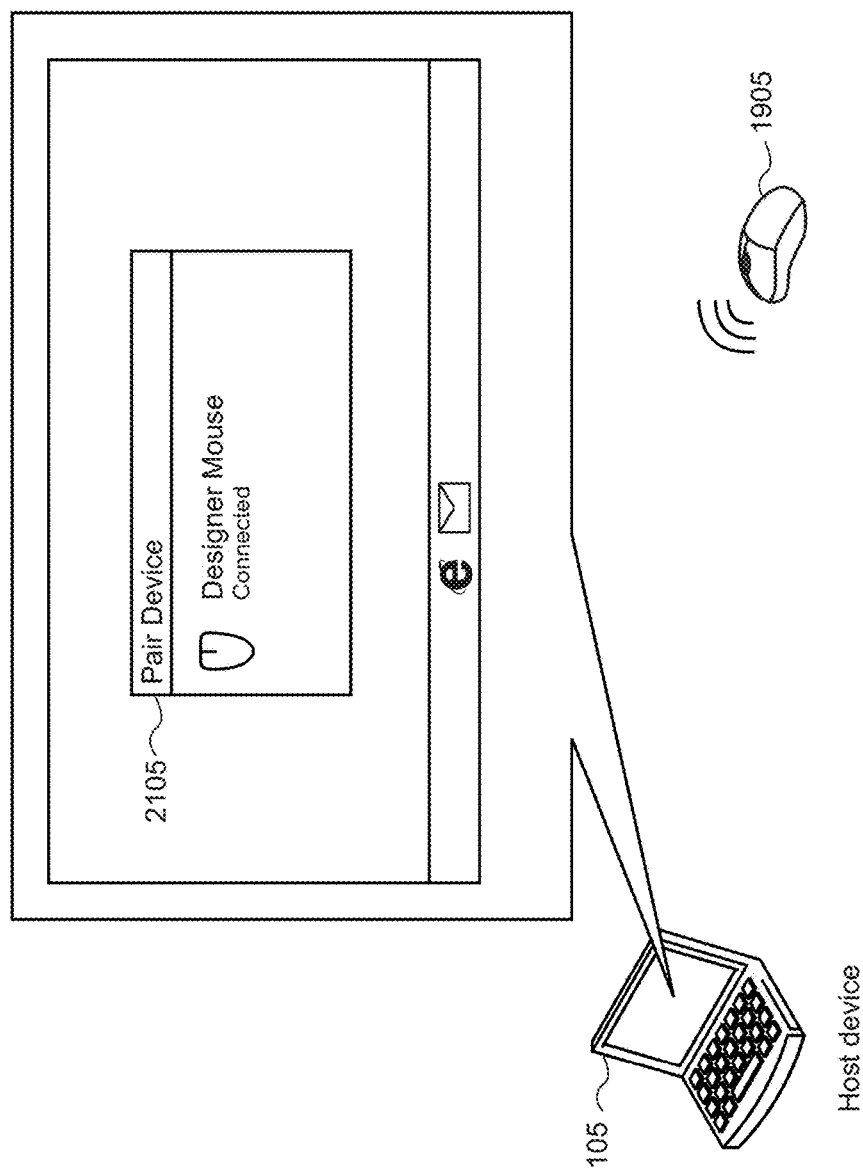
FIG. 21 shows an illustrative UI which confirms pairing between the host and peripheral devices.

FIG. 20 shows an illustrative UI where quick pair is enabled and operating, in which, upon the host device detecting the mouse's quick pair advertisement within its payload when in range, a toast 2005 is surfaced for the user to quickly pair the two devices. The peripheral device's name and image are based on information retrieved from the quick pair payload advertisement. Upon the user selecting "connect", as represented by input 2010, a notification 2105 indicating that the designer mouse is connected surfaces, as shown in FIG. 21. The user's set-up for the mouse is now complete. From here, the proximity platform, following the quick pair filters, may now dismiss the secondary filter at least with respect to the paired device. However, the primary filter may still be in effect in order to monitor advertisements from other wireless peripheral devices. Thus, any further beaconing from the paired peripheral device can be ignored by the host device since the host and peripheral devices are paired.

Figure 22:
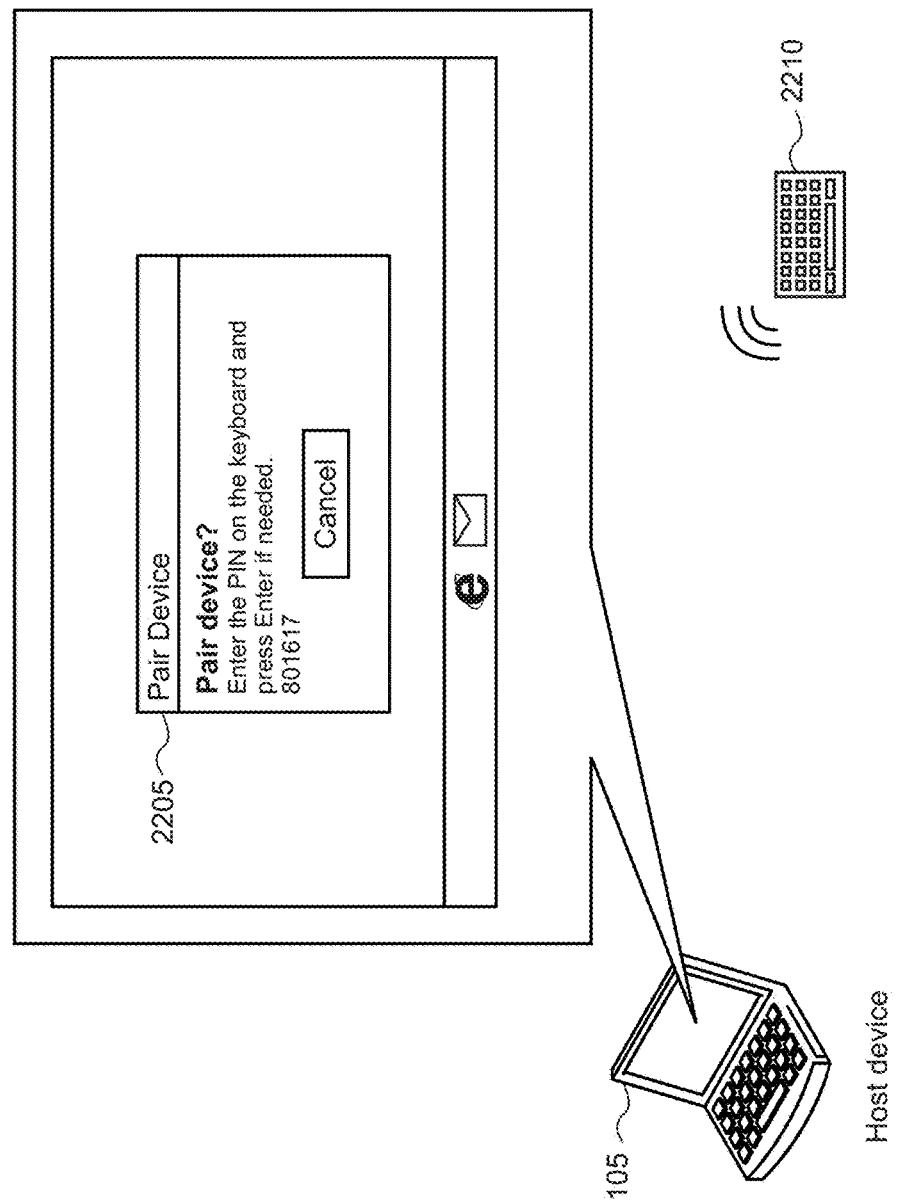
FIGS. 22-23 show illustrative security measures for the user to input or confirm a PIN before pairing the host and peripheral devices.
Figure 23:
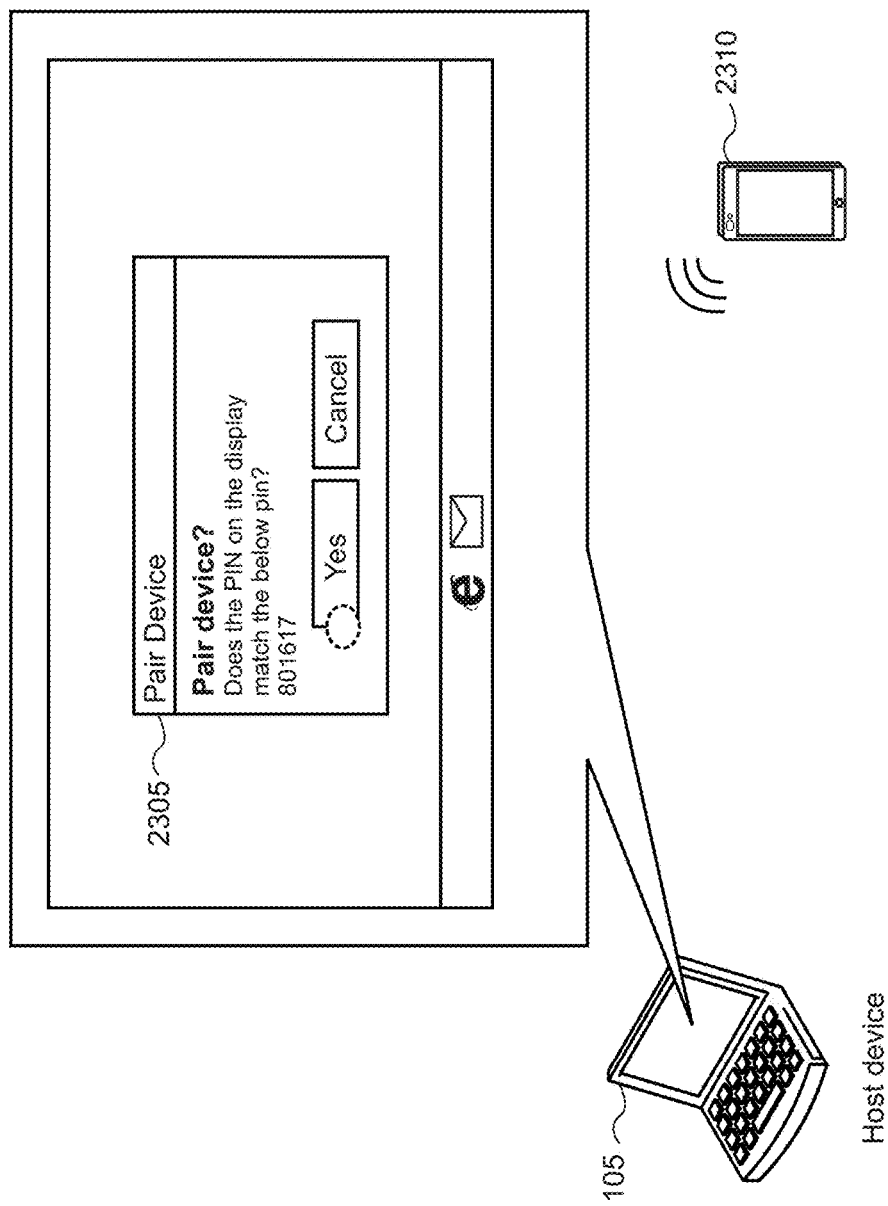

In some embodiments, after the quick pair scenarios are performed, security measures may be implemented for some capable devices. FIGS. 22-23 show illustrative toasts which provide an additional security measure when the user attempts to pair some peripheral devices with a host device laptop. For example, the toast 2205 in FIG. 22 prompts the user to enter a unique PIN into the keyboard 2210. The toast 2305 in FIG. 23 prompts the user to verify that a PIN on a display of the smartphone-peripheral device 2310 matches the PIN on the toast. These security measures can verify that the user's intended device is not a spoof attack.

Figure 24:
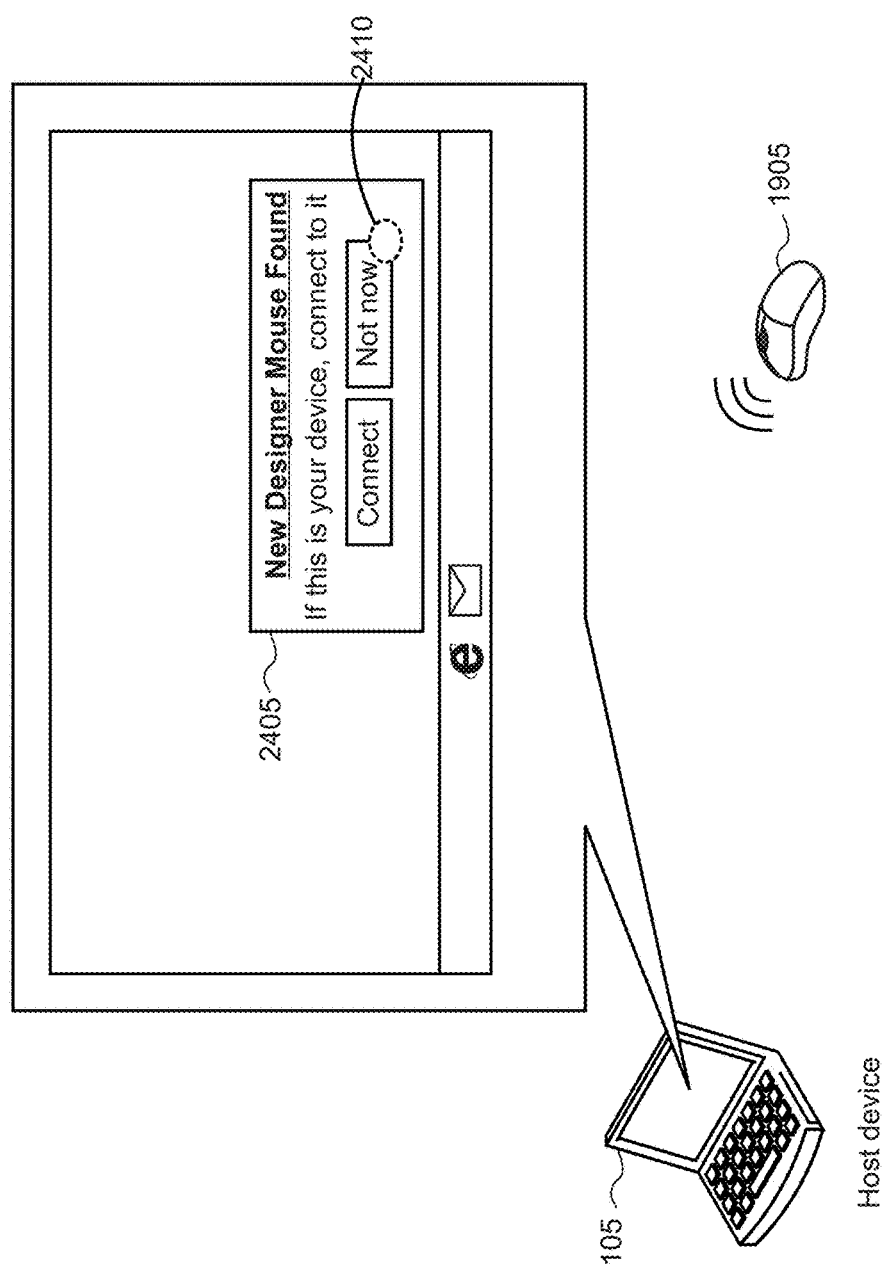
FIG. 24 shows an illustrative UI in which the user chooses not to pair the host device to the peripheral device.
Figure 25:
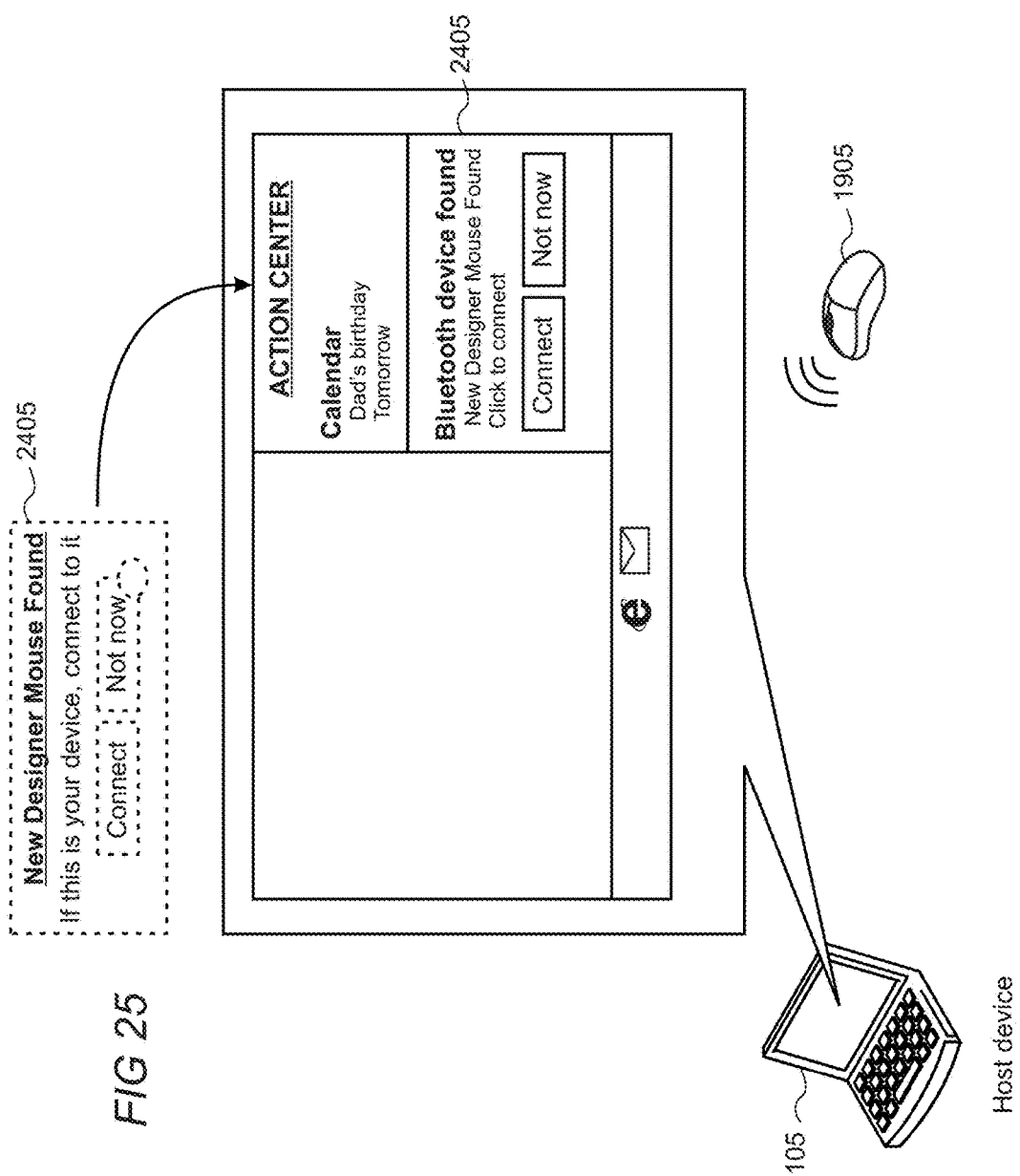
FIG. 25 shows an illustrative notification area which stores the toast from FIG. 24 for future user engagement.

FIG. 24 shows an illustrative scenario in which the user elects not to pair the laptop and mouse by selecting "Not now" on toast 2405 represented by input 2410. Subsequently and as shown in FIG. 25, the toast 2405 is then moved to an action center which stores, for example, pending actions that either require the user's attention or holistically provide information to the user. In this regard, the action center may alternatively be considered a notification center. Toast 2405 can stay in the action center and thereby allow the user to act on and pair with the discovered mouse at another time. In another embodiment, the toast can move to the action center if the user fails to act at all, that is, does not select "not now" but rather leaves the toast on the screen. In this scenario, the toast would move to the action center after it has not been acted upon for a preset period of time.

Figure 26:
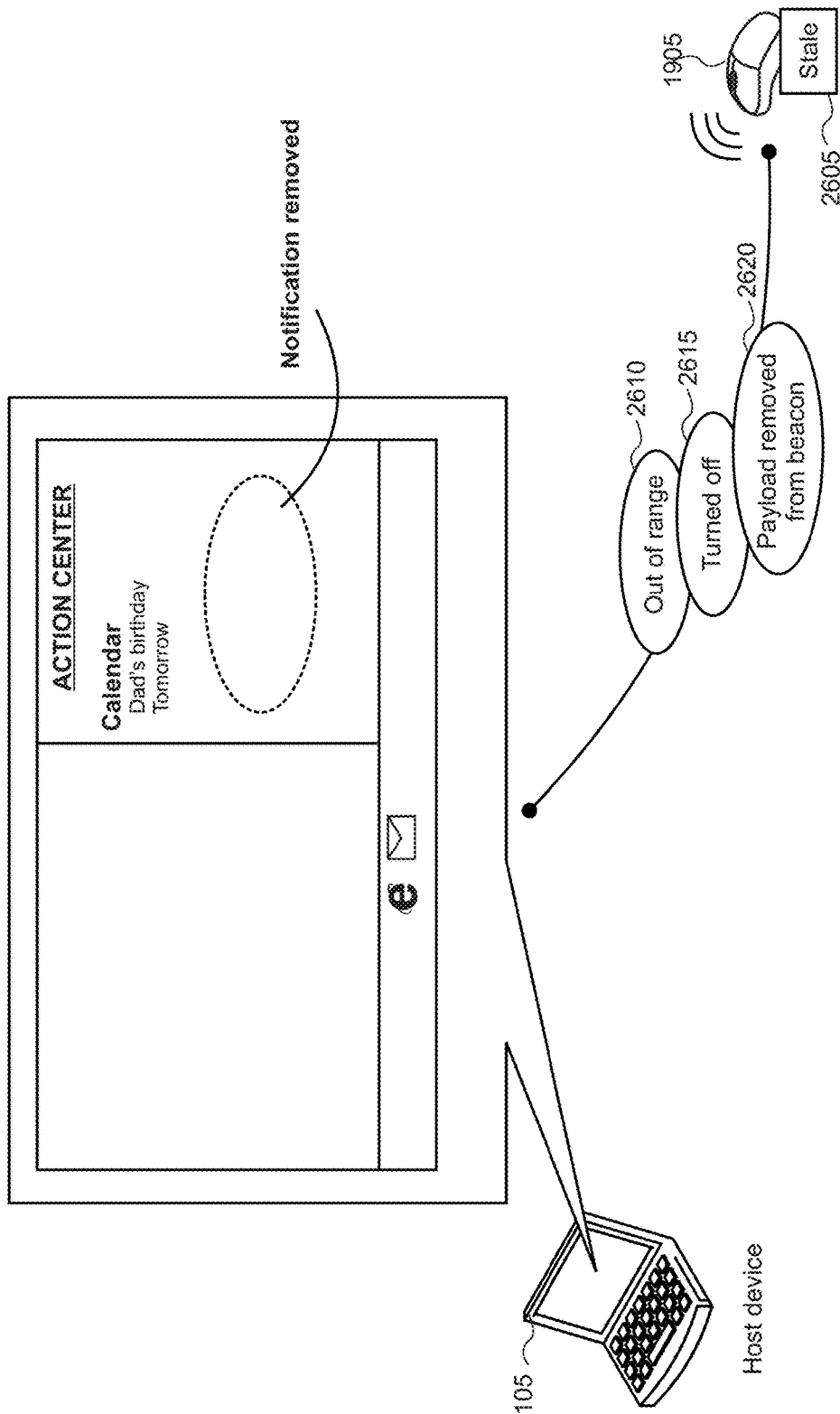
FIG. 26 shows an illustrative UI in which the toast is removed from the notification area.

The toast 2405 may remain in the action center until the user pairs with the mouse, cancels the toast, or the laptop detects that the mouse is stale. For example, FIG. 26 shows an illustrative scenario in which the mouse has gone stale 2605. The mouse can go stale for being out of range 2610, turned off 2615, or the payload has been removed from the beacon 2620. For example, the quick pair protocol can be configured to force the peripheral device to remove the quick pair payload from its advertisement for a pre-set period of time before the peripheral device exits pairable/connectible state. The host device in this example may transmit a signal to the peripheral device (e.g., using the wireless communication devices), which indicates to the peripheral device to remove the quick pair payload. The pre-set time may be 30 seconds, but can alternatively be five seconds, 10 seconds, one minute, etc. This mechanism can help synchronize the removal of the toast from the action center and adds additional resiliency against outages of the advertisement. For example, the timeout can be set higher for example since the host device deterministically can predict the occurrence upon detecting that the payload is removed.

The toasts may re-surface on the UI (FIG. 20) or the action center (FIG. 25) when the peripheral device is subsequently detected in the event the peripheral device went stale due to being out of range, turned off, or the payload temporarily removed. If the user dismissed the toast, however, the toast may not re-surface until the actions of the peripheral device interrupt the user's dismissal. Exemplary actions that can interrupt the user's dismissal can include the peripheral device being out of range, turned off, or the payload removed.

As discussed above with respect to FIGS. 16-18, the secondary filter may continue to track or monitor for the mouse to verify that it is still within a threshold presence. Thus, tracking of the mouse also allows the laptop to know when the mouse is no longer beaconing and therefore stale. Upon determining that the mouse is stale, the toast is removed from the action center to prevent an unsuspecting user to attempt to quick pair the peripheral devices while the peripheral device has gone stale. This provides additional convenience and an overall user-friendly experience.

Figure 27:
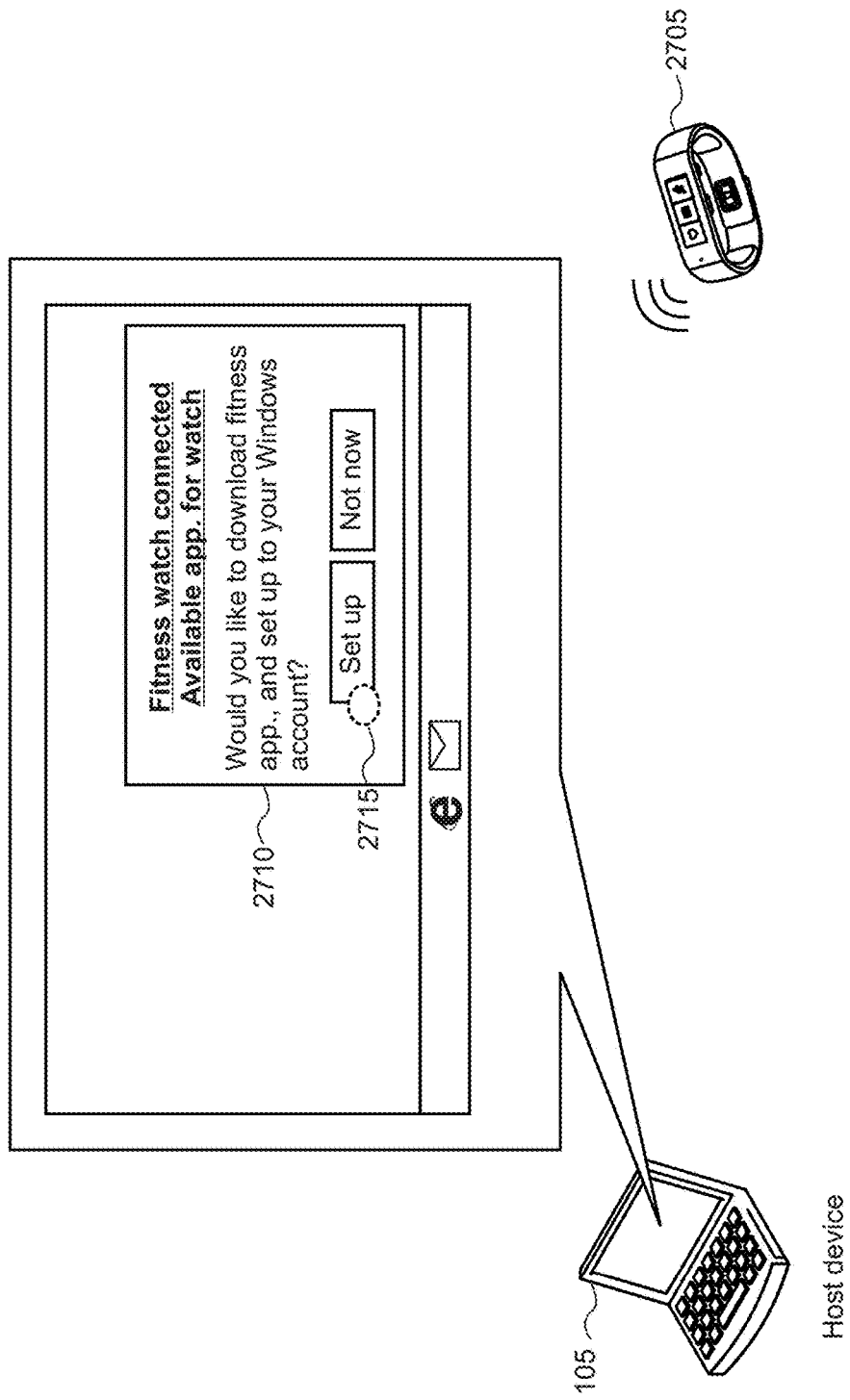
FIG. 27 shows an illustrative UI in which the host device surfaces a toast for the user to download a fitness application (app) and set up the user's wearable device.
Figure 28:
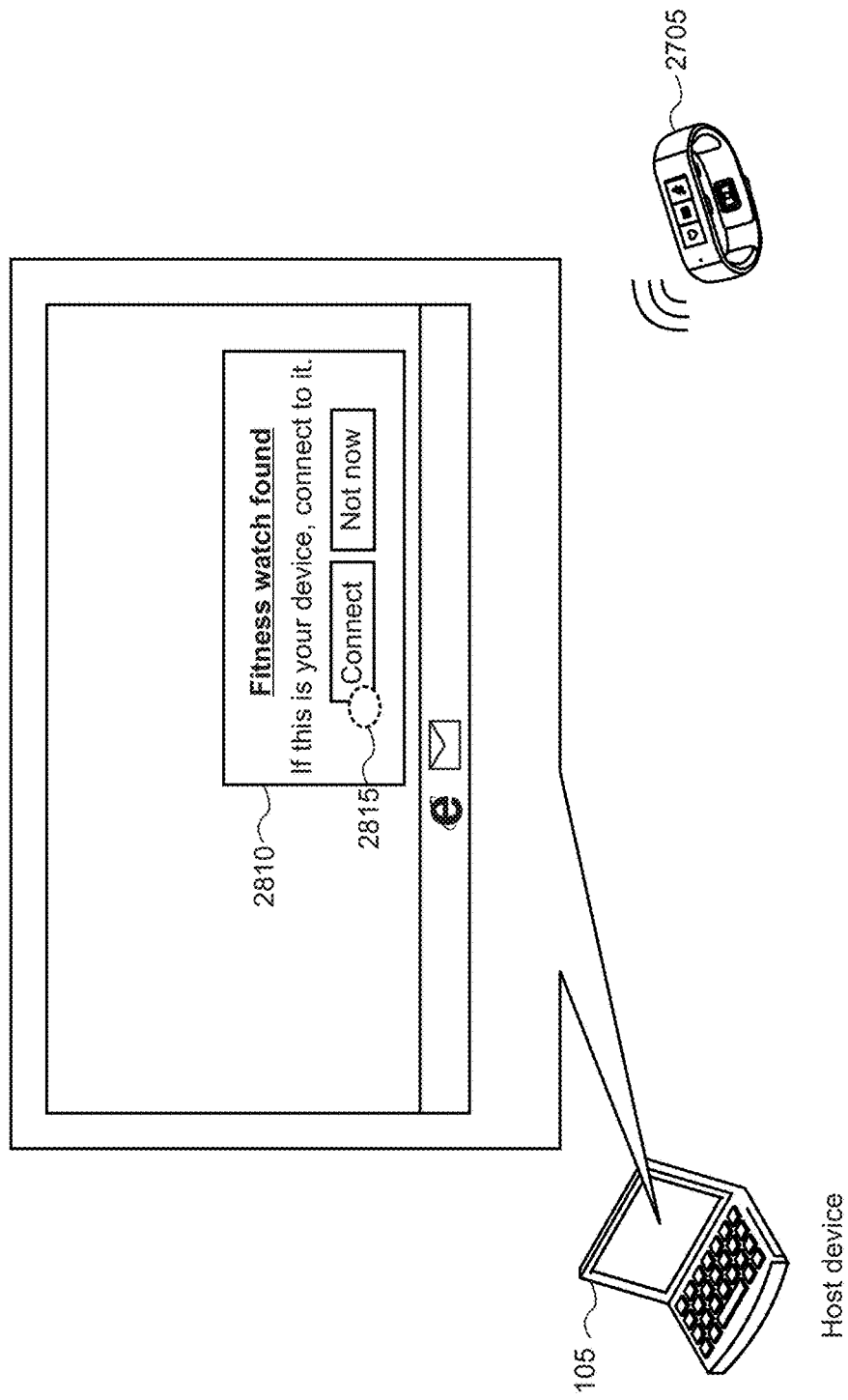
FIG. 28 shows an illustrative UI in which the host device surfaces a toast for the user to connect to a wearable watch.
Figure 29:
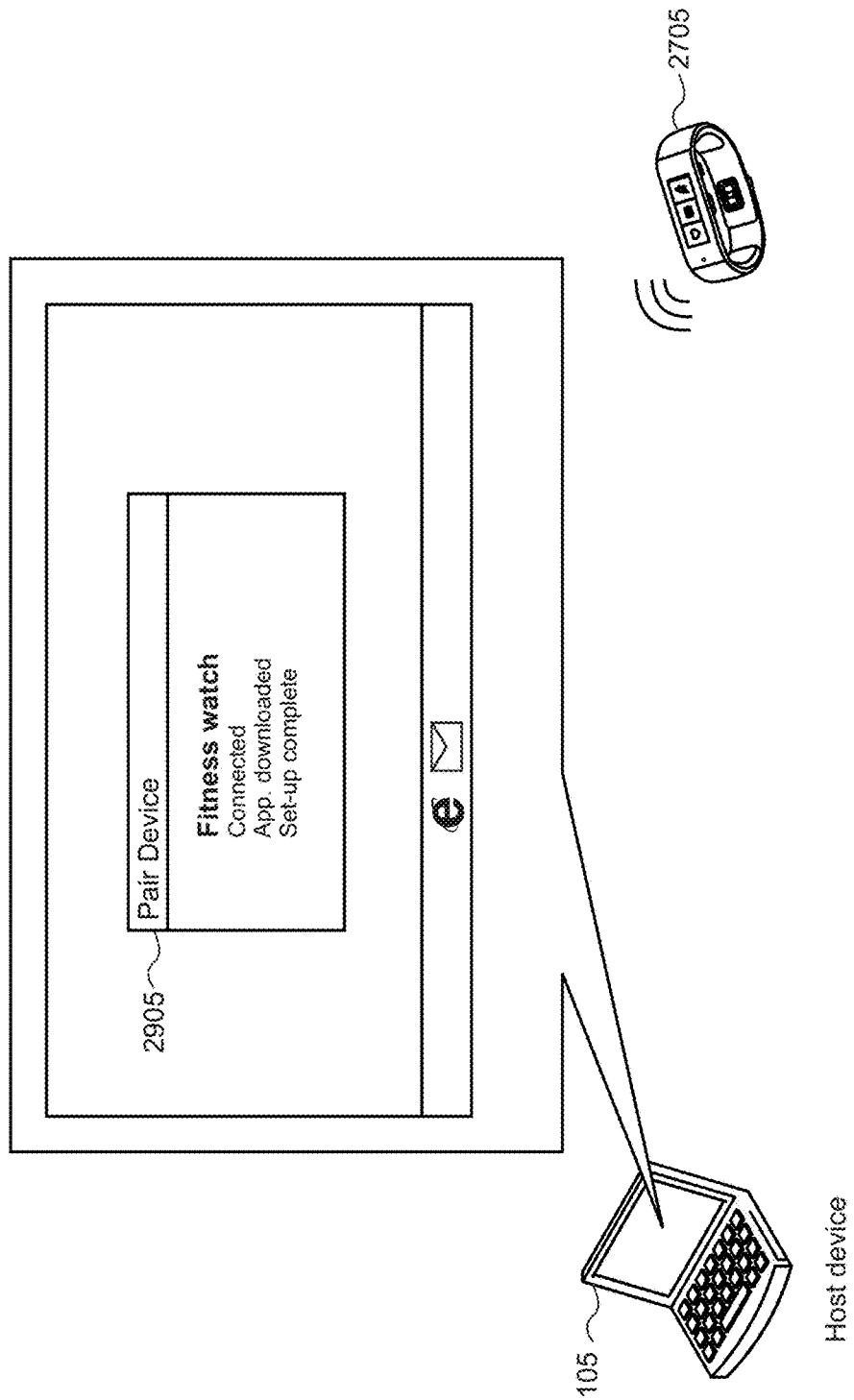
FIG. 29 shows an illustrative UI in which the host device confirms set-up of the wearable device.

FIGS. 27-29 show an illustrative quick pair scenario in which filters/scenarios are implemented for a wireless fitness watch utilizing Bluetooth. For example, the laptop in FIG. 27 detects the fitness watch 2705 is within range and according to quick pair protocols surfaces a toast 2710 which offers the user the opportunity to download a fitness application that is associated with the fitness watch 2705. The user can then select "set up" as represented by input 2715. In this scenario, the pattern within the advertisement payload for the fitness watch may have indicated to the proximity platform to execute additional scenarios that are convenient for using the fitness watch, which resulted in toast 2710.

FIG. 28 shows an illustrative scenario in which quick pair is further configured to surface a toast 2810 for the user to quickly pair the two devices. The user selects "connect" as represented by input 2815, which thereby pairs the two devices over Bluetooth without any further action. FIG. 29 illustrates all of the actions performed and completed on toast 2905 simply by the user inputting a few commands and never having to navigate to an app. store, settings panel, or the like. In the situation where the user postponed any of the toasts for the fitness watch, then the toasts may move to the action center for the user to act on at a later time.

The application downloaded may be automatically trusted and considered safe by the fitness watch and the laptop because the download was caused pursuant to the trusted payload pattern within the watch's advertisement payload and according to the proximity platform. Thus, the proximity platform can recognize certain devices as secure when they comply with the proximity platform and quick pair routines and protocols, and thereby serve as a basis for security for host and peripheral devices.

Advantageously and as described with respect to the fitness watch, applications, drivers, updates, and the like can be automatically and seamlessly installed for new peripheral devices. Thus, in situations where certain devices may not operate without a corresponding application on the host device, quick pair and its automatically triggering functions can reduce stress and work for the user. For people who are not particularly tech savvy, the quick pair ecosystem can make their lives significantly easier, such as for toddlers and those who do not use computers often.

Figure 30:
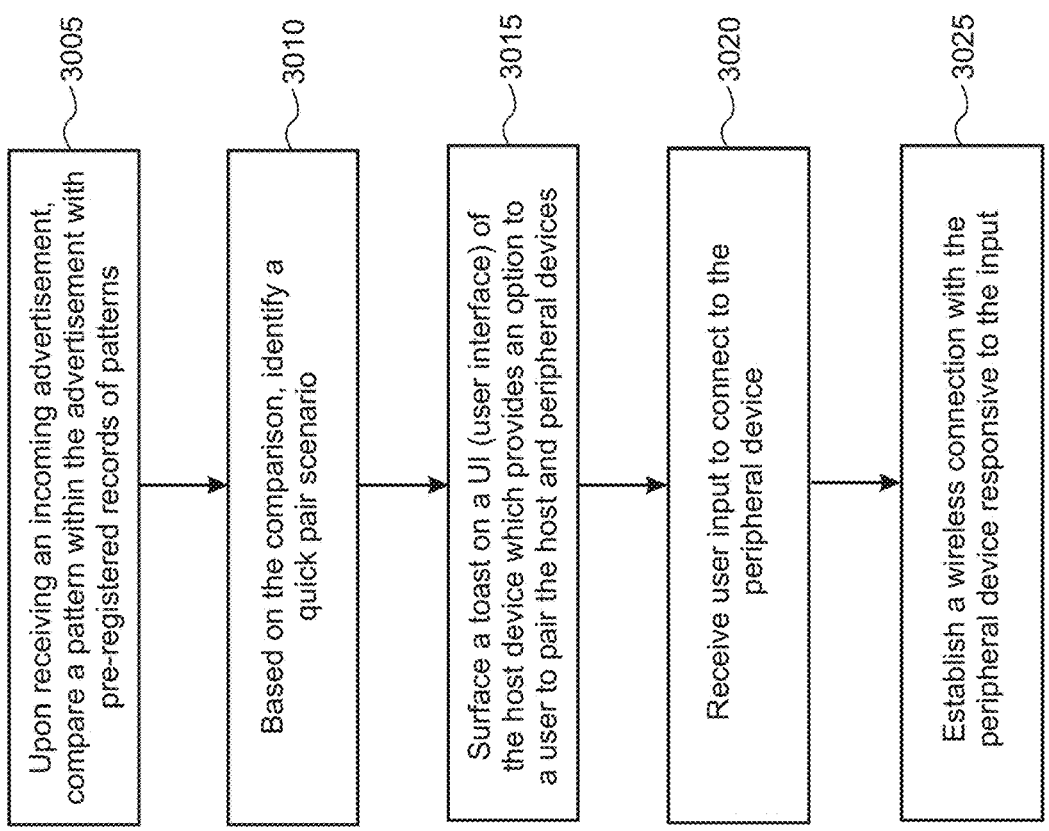
FIGS. 30-31 show illustrative processes performed by the host device and/or the peripheral device.

FIG. 30 is a flowchart of an illustrative method 3000 in which quick pair is implemented among host and peripheral devices. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 3005, upon receiving an incoming advertisement that is in range to the host device, a pattern within the advertisement is compared with pre-registered records of patterns. Respective patterns may have already been registered with the host device and its wireless communication device in order to perform the comparison. In step 3010, based on the comparison, a quick pair scenario is identified. In step 3015, a toast is surfaced on a UI of the host device which provides an option to a user to pair the host and peripheral devices. In step 3020, receive user input to connect to the peripheral device. In step 3025, establish a wireless connection with the peripheral device responsive to the input.

Figure 31:
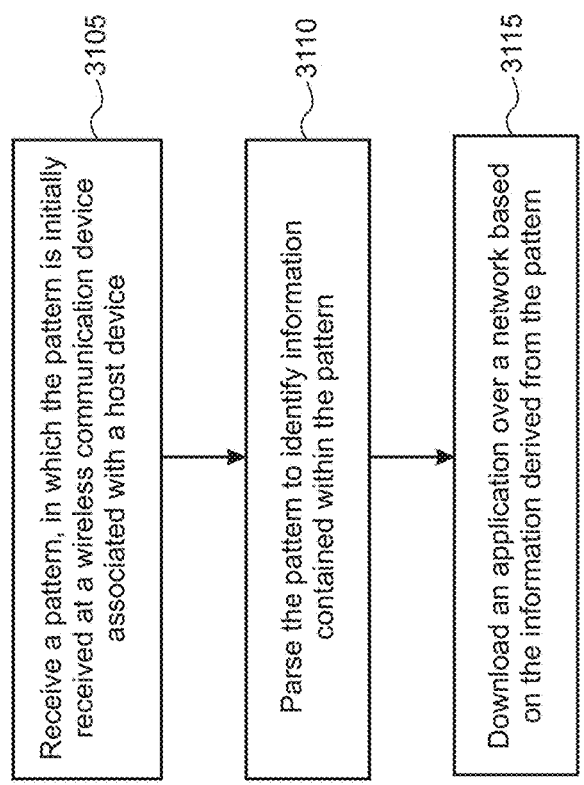

FIG. 31 shows another illustrative method 3100 in which a host device processes a quick pair scenario using the proximity platform. In step 3105 a pattern is received, in which the pattern is initially received at a wireless communication device associated with a host device. In step 3110, the pattern is parsed to identify information contained within the pattern. In step 3115, an application is downloaded over a network based on the information derived from the pattern.

Figure 32:
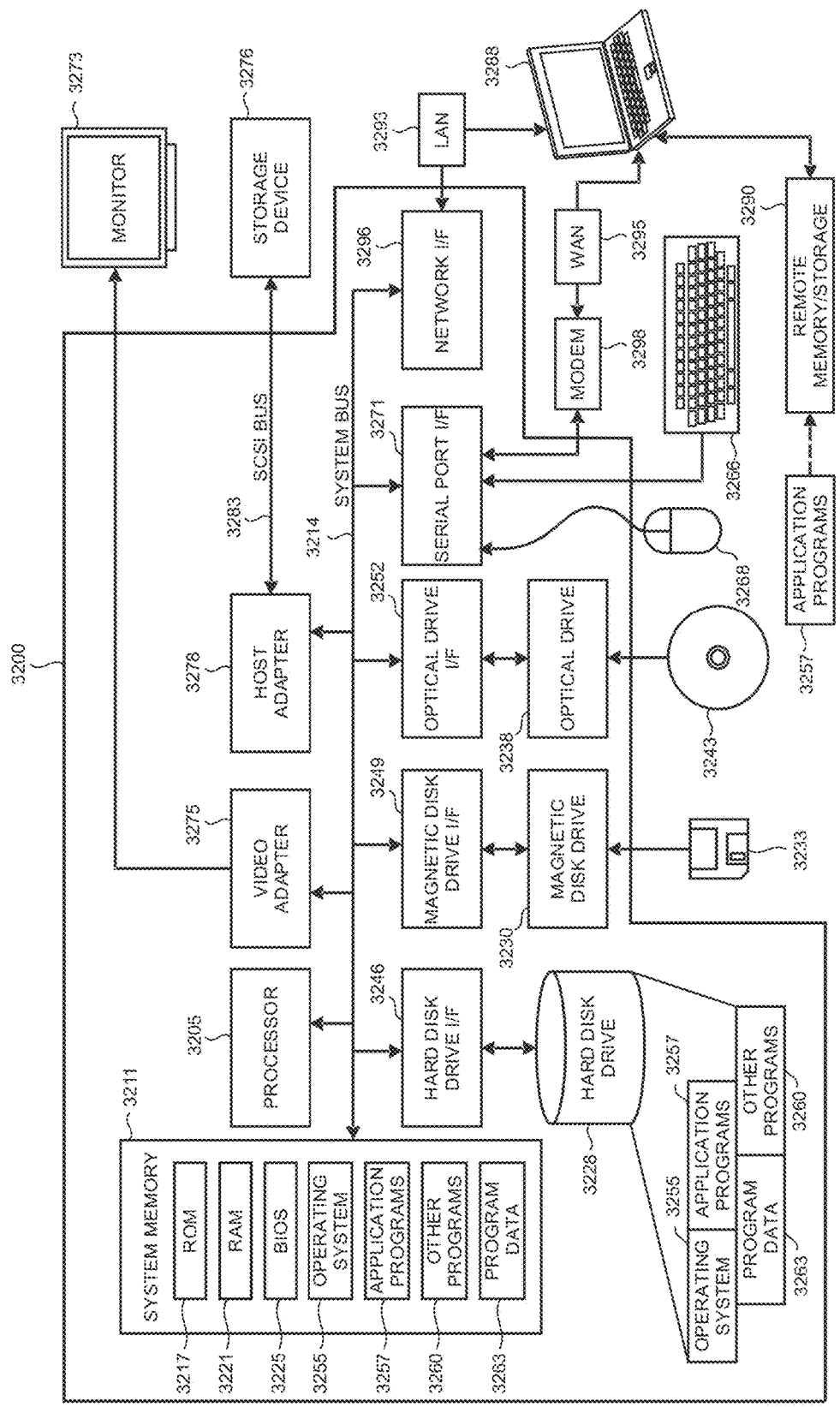
FIG. 32 is a simplified block diagram of an illustrative computer system such as a mobile device that may be used in part to implement the present quick pair.

FIG. 32 is a simplified block diagram of an illustrative computer system 3200 such as a PC, client machine, or server with which the present quick pair may be implemented. Computer system 3200 includes a processor 3205, a system memory 3211, and a system bus 3214 that couples various system components including the system memory 3211 to the processor 3205. The system bus 3214 may be any of several types of bus structures including a memory bus or memory controller, a peripheral bus, or a local bus using any of a variety of bus architectures. The system memory 3211 includes read only memory (ROM) 3217 and random access memory (RAM) 3221. A basic input/output system (BIOS) 3225, containing the basic routines that help to transfer information between elements within the computer system 3200, such as during startup, is stored in ROM 3217. The computer system 3200 may further include a hard disk drive 3228 for reading from and writing to an internally disposed hard disk (not shown), a magnetic disk drive 3230 for reading from or writing to a removable magnetic disk 3233 (e.g., a floppy disk), and an optical disk drive 3238 for reading from or writing to a removable optical disk 3243 such as a CD (compact disc), DVD (digital versatile disc), or other optical media. The hard disk drive 3228, magnetic disk drive 3230, and optical disk drive 3238 are connected to the system bus 3214 by a hard disk drive interface 3246, a magnetic disk drive interface 3249, and an optical drive interface 3252, respectively. The drives and their associated computer-readable storage media provide non-volatile storage of computer-readable instructions, data structures, program modules, and other data for the computer system 3200. Although this illustrative example includes a hard disk, a removable magnetic disk 3233, and a removable optical disk 3243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present quick pair. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk drive 3228, magnetic disk drive 3230, optical disk drive 3238, ROM 3217, or RAM 3221, including an operating system 3255, one or more application programs 3257, other program modules 3260, and program data 3263. A user may enter commands and information into the computer system 3200 through input devices such as a keyboard 3266 and pointing device 3268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 3205 through a serial port interface 3271 that is coupled to the system bus 3214, but may be connected by other interfaces, such as a parallel port, game port, or universal serial bus (USB). A monitor 3273 or other type of display device is also connected to the system bus 3214 via an interface, such as a video adapter 3275. In addition to the monitor 3273, personal computers typically include other peripheral output devices (not shown), such as speakers and printers. The illustrative example shown in FIG. 32 also includes a host adapter 3278, a Small Computer System Interface (SCSI) bus 3283, and an external storage device 3276 connected to the SCSI bus 3283.

The computer system 3200 is operable in a networked environment using logical connections to one or more remote computers, such as a remote computer 3288. The remote computer 3288 may be selected as another personal computer, a server, a router, a network PC, a peer device, or other common network node, and typically includes many or all of the elements described above relative to the computer system 3200, although only a single representative remote memory/storage device 3290 is shown in FIG. 32. The logical connections depicted in FIG. 32 include a local area network (LAN) 3293 and a wide area network (WAN) 3295. Such networking environments are often deployed, for example, in offices, enterprise-wide computer networks, intranets, and the Internet.

When used in a LAN networking environment, the computer system 3200 is connected to the local area network 3293 through a network interface or adapter 3296. When used in a WAN networking environment, the computer system 3200 typically includes a broadband modem 3298, network gateway, or other means for establishing communications over the wide area network 3295, such as the Internet. The broadband modem 3298, which may be internal or external, is connected to the system bus 3214 via a serial port interface 3271. In a networked environment, program modules related to the computer system 3200, or portions thereof, may be stored in the remote memory storage device 3290. It is noted that the network connections shown in FIG. 32 are illustrative and other means of establishing a communications link between the computers may be used depending on the specific requirements of an application of the present quick pair.

Figure 33:
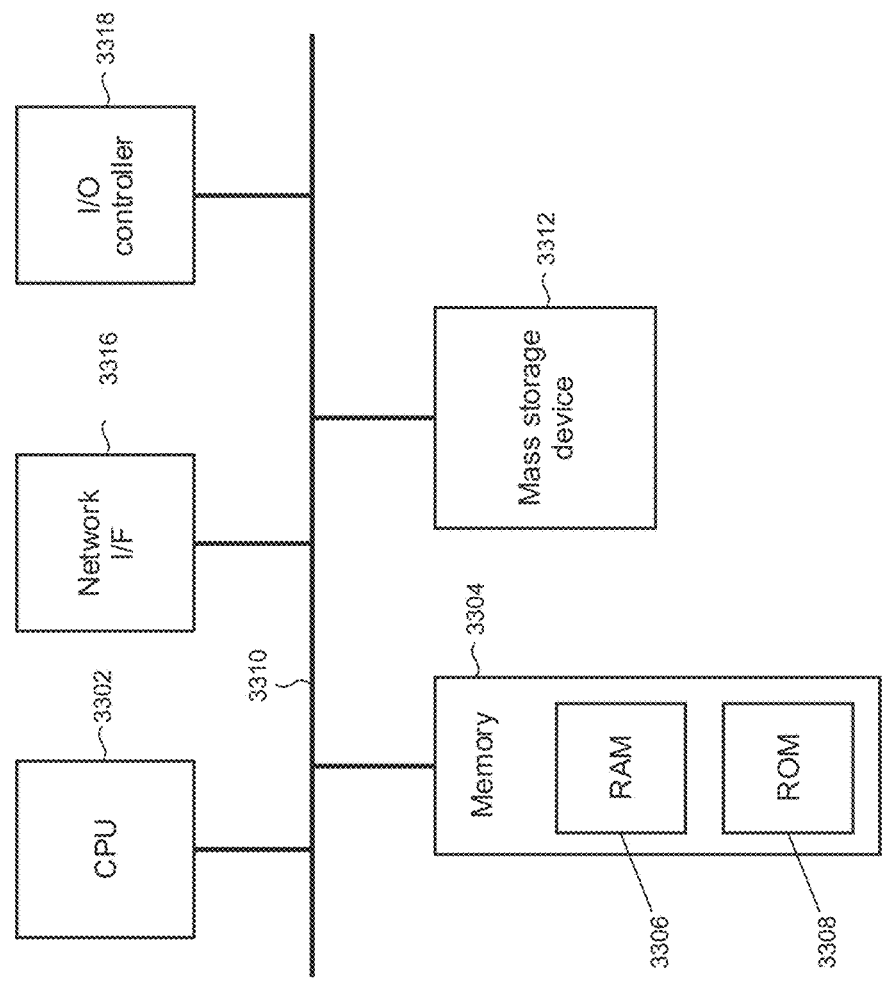
FIG. 33 shows a block diagram of an illustrative host or peripheral device that may be used in part to implement the present quick pair.

FIG. 33 shows an illustrative architecture 3300 for a device capable of executing the various components described herein for the present quick pair. Thus, FIG. 33 shows an architecture that may be adapted for a server computer, mobile phone, a PDA, a smartphone, a desktop computer, a netbook computer, a tablet computer, GPS device, gaming console, and/or a laptop computer. The architecture 3300 may be utilized to execute any aspect of the components presented herein.

The architecture 3300 illustrated in FIG. 33 includes a CPU (Central Processing Unit) 3302, a system memory 3304, including a RAM 3306 and a ROM 3308, and a system bus 3310 that couples the memory 3304 to the CPU 3302. A basic input/output system containing the basic routines that help to transfer information between elements within the architecture 3300, such as during startup, is stored in the ROM 3308. The architecture 3300 further includes a mass storage device 3312 for storing software code or other computer-executed code that is utilized to implement applications, the file system, and the operating system.

The mass storage device 3312 is connected to the CPU 3302 through a mass storage controller (not shown) connected to the bus 3310. The mass storage device 3312 and its associated computer-readable storage media provide non-volatile storage for the architecture 3300.

Although the description of computer-readable storage media contained herein refers to a mass storage device, such as a hard disk or CD-ROM drive, it may be appreciated by those skilled in the art that computer-readable storage media can be any available storage media that can be accessed by the architecture 3300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3300.

According to various embodiments, the architecture 3300 may operate in a networked environment using logical connections to remote computers through a network. The architecture 3300 may connect to the network through a network interface unit 3316 connected to the bus 3310. It may be appreciated that the network interface unit 3316 also may be utilized to connect to other types of networks and remote computer systems. The architecture 3300 also may include an input/output controller 3318 for receiving and processing input from a number of other devices, including a keyboard, mouse, or electronic stylus (not shown in FIG. 33). Similarly, the input/output controller 3318 may provide output to a display screen, a printer, or other type of output device (also not shown in FIG. 33).

It may be appreciated that the software components described herein may, when loaded into the CPU 3302 and executed, transform the CPU 3302 and the overall architecture 3300 from a general-purpose computing system into a special-purpose computing system customized to facilitate the functionality presented herein. The CPU 3302 may be constructed from any number of transistors or other discrete circuit elements, which may individually or collectively assume any number of states. More specifically, the CPU 3302 may operate as a finite-state machine, in response to executable instructions contained within the software modules disclosed herein. These computer-executable instructions may transform the CPU 3302 by specifying how the CPU 3302 transitions between states, thereby transforming the transistors or other discrete hardware elements constituting the CPU 3302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3300 in order to store and execute the software components presented herein. It also may be appreciated that the architecture 3300 may include other types of computing devices, including handheld computers, embedded computer systems, smartphones, and PDAs known to those skilled in the art. It is also contemplated that the architecture 3300 may not include all of the components shown in FIG. 33, may include other components that are not explicitly shown in FIG. 33, or may utilize an architecture completely different from that shown in FIG. 33.

Figure 34:
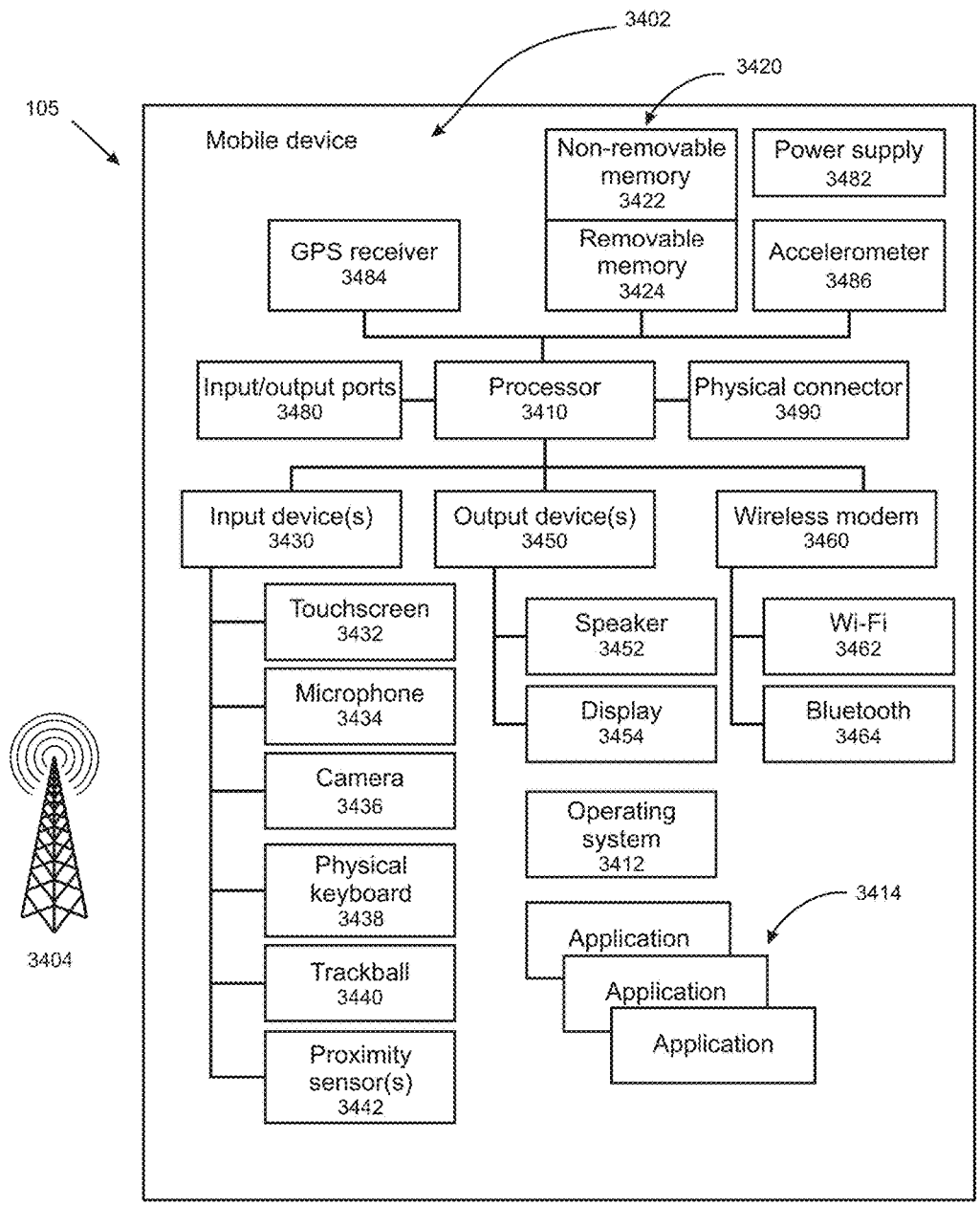
FIG. 34 shows a block diagram of an illustrative host or peripheral computing device that may be used to implement the present quick pair.

FIG. 34 is a functional block diagram of an illustrative host computing device 105 such as a mobile phone or smartphone including a variety of optional hardware and software components, shown generally at 3402. Any component 3402 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3404, such as a cellular or satellite network.

The illustrated device 105 can include a controller or processor 3410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3412 can control the allocation and usage of the components 3402, including power states, above-lock states, and below-lock states, and provides support for one or more application programs 3414. The application programs can include common mobile computing applications (e.g., image-capture applications, e-mail applications, calendars, contact managers, web browsers, messaging applications), or any other computing application.

The illustrated device 105 can include memory 3420. Memory 3420 can include non-removable memory 3422 and/or removable memory 3424. The non-removable memory 3422 can include RAM, ROM, Flash memory, a hard disk, or other well-known memory storage technologies. The removable memory 3424 can include Flash memory or a Subscriber Identity Module (SIM) card, which is well known in GSM (Global System for Mobile communications) systems, or other well-known memory storage technologies, such as "smart cards." The memory 3420 can be used for storing data and/or code for running the operating system 3412 and the application programs 3414. Example data can include web pages, text, images, sound files, video data, or other data sets to be sent to and/or received from one or more network servers or other devices via one or more wired or wireless networks.

The memory 3420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 105.

The memory 3420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 105 can support one or more input devices 3430—such as a touchscreen 3432; microphone 3434 for implementation of voice input for voice recognition, voice commands and the like; camera 3436; physical keyboard 3438; trackball 3440; and/or proximity sensor 3442; and one or more output devices 3450—such as a speaker 3452 and one or more displays 3454. Other input devices (not shown) using gesture recognition may also be utilized in some cases. Other possible output devices (not shown) can include piezoelectric or haptic output devices. Some devices can serve more than one input/output function. For example, touchscreen 3432 and display 3454 can be combined into a single input/output device.

A wireless modem 3460 can be coupled to an antenna (not shown) and can support two-way communications between the processor 3410 and external devices, as is well understood in the art. The modem 3460 is shown generically and can include a cellular modem for communicating with the mobile communication network 3404 and/or other radio-based modems (e.g., Bluetooth® 3464 or Wi-Fi 3462). The wireless modem 3460 is typically configured for communication with one or more cellular networks, such as a GSM network for data and voice communications within a single cellular network, between cellular networks, or between the device and a public switched telephone network (PSTN).

The device can further include at least one input/output port 3480, a power supply 3482, a satellite navigation system receiver 3484, such as a GPS receiver, an accelerometer 3486, a gyroscope (not shown), and/or a physical connector 3490, which can be a USB port, IEEE 1394 (FireWire) port, and/or an RS-232 port. The illustrated components 3402 are not required or all-inclusive, as any components can be deleted and other components can be added.

Various exemplary embodiments of the present quick pair are now presented by way of illustration and not as an exhaustive list of all embodiments. An example includes a method for executing scenarios on a host device based on proximity to a peripheral device, in which the host device includes a wireless communication device to at least monitor beaconing from the peripheral device, the method comprising: registering a pattern from a service that details characteristics of and handling for the peripheral device at the host device; receiving an indication that the peripheral device is within a threshold presence to the host device; responsively to receiving the indication, periodically tracking the peripheral device to verify a distance of the peripheral device from the host device has not extended beyond the threshold presence.

In another example, the pattern includes fields, each field representing one or more of the characteristics or handling details for the peripheral device upon the peripheral device connecting to the host device. As another example, the fields of the pattern include filters that specify the handling for the peripheral device, such that the periodic tracking of the peripheral device includes verifying that the one or more filters are consistently satisfied while the peripheral device is connected or beaconing to the host device. In another example, the fields represent a manufacturer associated with the peripheral device, a scenario for the peripheral device, and a sub-scenario for the peripheral device, wherein the scenario indicates an action to perform and the sub-scenario provides additional details about the action to perform. In another example, the connection or beaconing from the peripheral device to the host devices is according to Bluetooth protocols. In a further example, the method can include receiving an advertisement transmission from the peripheral device when the peripheral device is within the threshold presence to the host device; matching the advertisement transmission to the registered pattern to determine which actions to perform for the peripheral device. In another example, the method can include registering a plurality of patterns with a plurality of respective services, in which each pattern specifies characteristics and handling for a particular peripheral device, group of peripheral devices, or category of peripheral devices.

Another example includes a computing devices comprised of a wireless communication device that periodically monitors for incoming advertisement transmissions; one or more processors in communication with the wireless communication device; and one or more non-transitory hardware-based memory devices storing computer-readable instructions which, when executed by the one or more processors, cause the computing device to: upon identifying an incoming advertisement, parse a pattern within the incoming advertisement such that portions of the pattern define characteristics for a peripheral device associated with the incoming advertisement; identify a live RSSI (Received Signal Strength Indication) value associated with the peripheral device; and determine a distance from the host device for the peripheral device using the live RSSI value and a calibrated RSSI value for the peripheral device, in which the calibrated RSSI value accounts for varying characteristics associated with live connections between computing devices and the peripheral device.

As another example, the determined distance is further based on a set distance which was used to obtain the calibrated RSSI value. In another example, the calibrated RSSI value is based on previous measurements between a different, related peripheral device that corresponds to the peripheral device against a reference host device, such that determining the distance using the calibrated RSSI value and the live RSSI value indicates one or more of a distance between the peripheral device and the computing device or a particular distal parameter. As another example, the computer-readable instructions further cause the computing device to: establish buckets for the peripheral device, the buckets representing defined distances from the computing device or distal categories that at least partially represent a defined distance from the computing device; project a distance for the peripheral device from the computing device using one or both of the calibrated RSSI value or the RSSI value; and identify a bucket for the peripheral device based on the projected distance. In another example, the established buckets for the peripheral device are based on one or more of previous connections or previous calibrations between a host device and one or more corresponding peripheral devices, or previously received advertisements from the one or more corresponding peripheral devices to the computing device. As another example, the established buckets are adjusted using the previous connections, previous calibrations, or previously received advertisements. As another example, the computer-readable instructions further cause the computing device to: track the peripheral device using a subsequent RSSI value; identify a subsequent bucket for the peripheral device based on the subsequent RSSI value; and perform an action when the identified subsequent bucket for the peripheral device changes from the previously identified bucket. As another example, the peripheral device includes headphones, keyboard, mouse, speaker, camera, display, or printer.

In another exemplary embodiment, one or more non-transitory hardware-based computer-readable memory devices store instructions which, when executed by one or more processors disposed in a host device, cause the host device to: register a plurality of records that detail at least one or more filters and handling operations for the host device upon receiving an advertisement, wherein the records are respectively associated with a service or application from a plurality of services or applications executing on the host device; and when the host device receives a beacon containing the advertisement, apply a first filter, wherein the applied first filter corresponds to a pattern contained within the received advertisement.

As another example, one service or application is associated with two or more records of the plurality of records. As another example, after the host device applies the first filter, the instructions further cause the host device to apply a second filter using another pattern contained within the received advertisement. In another example, the instructions further cause the host device to dismiss the second filter after its application, and continue executing the first filter to detect additional advertisements. In another example, one or both of the first and second filters include sub-filters which further define an applicable action for the host device to perform based on the advertisement.

In another exemplary embodiment, a peripheral computing device configured with point-to-point short-range connection capabilities, comprising: a wireless communication device configured to broadcast an advertisement to external devices; one or more processors in communication with the wireless communication device; and one or more non-transitory hardware-based memory devices storing a data packet structure for the wireless communication device, and further storing computer-readable instructions executable by the one or more processors, wherein the data packet structure includes a PDU (Protocol Data Unit) that includes a header and a payload, the payload of which is modified to include a first field defining an actionable scenario and a second field defining a sub-scenario associated with the actionable scenario.

In another exemplary embodiment, the first and second fields include pre-defined octet patterns. In another example, the actionable scenario indicates to external devices that the peripheral device is configured to quick pair with an external device, such that the peripheral device's beacon patterns are pre-registered within an OS (Operating System) of the external device and the peripheral device is ready for pairing. As another example, pre-registration of the peripheral device at the external device's OS includes storing one or more patterns associated with the peripheral device, such that the OS automatically recognizes handling operations for the peripheral device upon the one or more patterns corresponding to patterns within the first and second fields. In another example, detection of quick pair for the peripheral device that is in range causes the OS of the external device to automatically prompt on a user interface (UI) thereof an opportunity for a user to connect the peripheral device to the external device. As another example, the computer-readable instructions further cause the one or more processors to pair the peripheral device to the external device upon input confirmation from a user. In another example, the wireless communication device utilizes one or more of Bluetooth, NFC (Near Field Communication), or Wi-Fi.

Another embodiment includes a computing device, comprising: a transceiver that periodically monitors for incoming advertisement transmissions; one or more processors in communication with the transceiver; one or more non-transitory hardware-based memory devices storing computer-readable instructions which, when executed by the one or more processors, cause the computing device to: upon receiving an incoming advertisement transmission, compare a pattern within the advertisement transmission with pre-registered records of patterns and measure that a peripheral device is within range; and based on the comparison, identify a quick pair scenario, wherein the quick pair scenario causes the computing device to recognize that a peripheral device associated with the transmission of the advertisement is seeking to quick pair with the computing device, thereby causing the computing device to automatically surface, on a user interface (UI) of a display of the computing device, a toast that provides the user with an option to establish a wireless connection with the peripheral device.

As another example, the computer-readable instructions further cause the computing device to: receive user input to connect to the peripheral device; and establish the wireless connection with the peripheral device responsive to the input. As another exemplary example, the computer-readable instructions further cause the computing device to: monitor for user interaction at the toast for a predetermined period of time; and after the predetermined period of time expires, move the toast into an action center which enables the user to quick pair the peripheral device to the computing device at a later time. As a further example, the computer-readable instructions further cause the computing device to: monitor for beaconing from the peripheral device; and maintain the toast in the action center while beaconing is detected at the computing device. As another example, the computer-readable instructions further cause the computing device to: monitor for beaconing from the peripheral device; determine whether the toast is stale; and based on the determination that the toast is stale, remove the toast from the notification center. In another example, the computer-readable instructions further cause the computing device to: continue to monitor for beaconing from the peripheral device; and when the beaconing from the peripheral device is detected again, re-surface the toast on the UI or the notification center. As another example, the peripheral device is stale based on one or more of a location of the peripheral device extending beyond a threshold distance, the peripheral device is switched off, a presence or absence of a specific pattern in the beaconing, or a payload has been removed from the advertisement. In another example, the computer-readable instructions further cause the computing device to: apply a primary filter according to a quick pair scenario, in which the primary filter causes the computing device to passively scan for advertisements from the peripheral device; and apply a secondary filter, in which the secondary filter causes the computing device to passively scan for the presence or absence of the peripheral device using an address contained within the advertisement.

Another exemplary embodiment includes one or more non-transitory hardware-based computer-readable memory devices storing instructions which, when executed by one or more processors disposed in a host device, cause the host device to: receive a pattern, in which the pattern is initially retrieved at a wireless communication device associated with the host device; parse the pattern to identify information contained within the pattern, wherein the information within the pattern indicates a manufacturer, quick pair enabled and an associated application; and responsive to user's permission, download the application over a network based on the information derived from the pattern.

In another example, the information contained within the pattern is for an external computing device not yet associated with the host device. As another example, surfacing a toast to the user that the application is available to download for the peripheral device, in which the application is downloaded in response to an input from the user. In another example, the application is automatically trusted by the host device upon downloading based on the application being identified and downloaded according to the advertisement payload. In another example, the peripheral device is any one of headphones, keyboard, mouse, speaker, camera, display, or printer.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A peripheral computing device configured with point-to-point short-range connection capabilities, comprising:
   a wireless communication device configured to broadcast an advertisement to external devices;
   one or more processors in communication with the wireless communication device; and
   one or more non-transitory hardware-based memory devices storing a data packet structure for the wireless communication device, and further storing computer-readable instructions executable by the one or more processors, wherein the data packet structure includes a PDU (Protocol Data Unit) that includes a header and a payload, the payload of which is modified to include a first field defining an actionable scenario and a second field defining a sub-scenario associated with the actionable scenario, wherein the executable instructions cause the peripheral computing device to:
   broadcast the advertisement to an external device, wherein the advertisement includes beacon patterns within the payload that define the actionable scenario and the sub-scenario to be performed by the external device,
   wherein beacon patterns for the actionable scenario and the sub-scenario are pre-registered within an OS (Operating System) of the external device to at least indicate that the peripheral computing device is ready for pairing, and wherein the actionable scenario causes the external device to request user permission to connect to the peripheral device; and
   pair with the external device responsively to the user granting permission on the external device.

2. The peripheral computing device of claim 1, in which the first and second fields include pre-defined octet patterns.

3. The peripheral computing device of claim 1, in which pre-registration of the peripheral computing device at the external device's OS includes storing one or more patterns associated with the peripheral computing device, such that the OS automatically recognizes handling operations for the peripheral computing device upon the one or more patterns corresponding to patterns within the first and second fields.

4. The peripheral computing device of claim 1, in which the wireless communication device utilizes one or more of Bluetooth, NFC (Near Field Communication), or Wi-Fi.

* * * * *